(12) United States Patent
Peng et al.

(10) Patent No.: US 12,100,811 B2
(45) Date of Patent: Sep. 24, 2024

(54) ELECTROLYTE, AND ELECTROCHEMICAL DEVICE AND ELECTRONIC DEVICE COMPRISING THE SAME

(71) Applicant: Ningde Amperex Technology Limited, Ningde (CN)

(72) Inventors: Xiexue Peng, Ningde (CN); Jianming Zheng, Ningde (CN); Chao Tang, Ningde (CN)

(73) Assignee: Ningde Amperex Technology Limited, Ningde (CN)

( * ) Notice: Subject to any disclaimer, the term of this patent is extended or adjusted under 35 U.S.C. 154(b) by 443 days.

(21) Appl. No.: 17/474,335

(22) Filed: Sep. 14, 2021

(65) Prior Publication Data
US 2022/0052382 A1 Feb. 17, 2022

Related U.S. Application Data

(63) Continuation of application No. PCT/CN2020/108970, filed on Aug. 13, 2020.

(51) Int. Cl.
*H01M 10/0568* (2010.01)
*C07F 9/50* (2006.01)
(Continued)

(52) U.S. Cl.
CPC ....... *H01M 10/0568* (2013.01); *C07F 9/5004* (2013.01); *H01M 10/0525* (2013.01); *H01M 10/0567* (2013.01); *H01M 10/0569* (2013.01)

(58) Field of Classification Search
CPC ......... H01M 10/0568; H01M 10/0525; H01M 10/0567; H01M 10/0569; H01M 4/483;
(Continued)

(56) References Cited

U.S. PATENT DOCUMENTS

2010/0297508 A1* 11/2010 Lee .................. H01M 10/0567
429/324
2018/0309164 A1* 10/2018 Tang ..................... H01M 4/366
(Continued)

FOREIGN PATENT DOCUMENTS

| CN | 105609874 A | 5/2016 |
|----|-------------|--------|
| CN | 106415910 B | 5/2019 |

(Continued)

OTHER PUBLICATIONS

ISR for International Application PCT/CN2020/108970 mailed Feb. 25, 2021.
(Continued)

*Primary Examiner* — Abdullah A Riyami
*Assistant Examiner* — Nader J Alhawamdeh

(74) *Attorney, Agent, or Firm* — Ladas & Parry LLP

(57) ABSTRACT

An electrolyte including at least a compound of formula I:

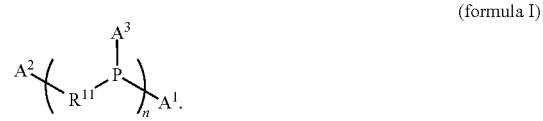

(formula I)

$A^1$, $A^2$, and $A^3$ are each independently selected from the following formulas I-A, I-B, I-C, or I-D, and the $A^1$, $A^2$, and $A^3$ are not all I-A:

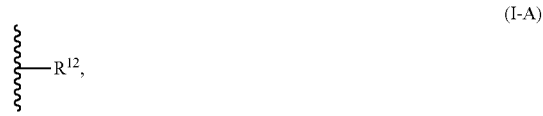

(I-A)

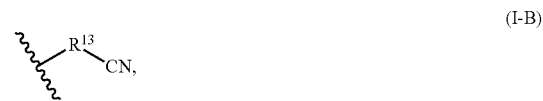

(I-B)

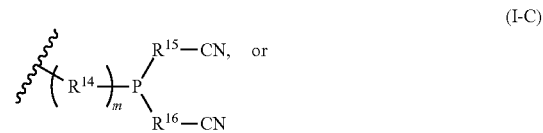

(I-C)

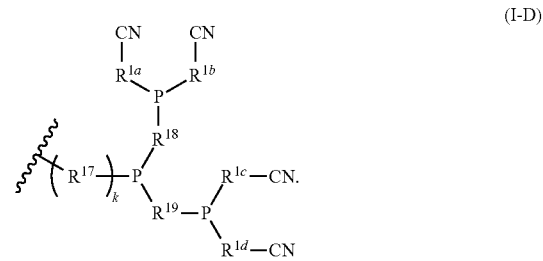

(I-D)

m and k are 0 or 1, and n is integer from 1 to 6. $R^{11}$, $R^{13}$, $R^{14}$, $R^{15}$, $R^{16}$, $R^{17}$, $R^{18}$, $R^{19}$, $R^{1a}$, $R^{1b}$, $R^{1c}$, and $R^{1d}$ are selected from hydrogen; substituted or unsubstituted $C_1$-$C_{10}$ alkylidene groups, $C_2$-$C_{10}$ alkenylene groups, $C_2$-$C_{10}$ alkynylidene groups, $C_3$-$C_{10}$ cumulative dienyl groups, $C_6$-$C_{10}$ aryl groups, or $C_3$-$C_{10}$ alicyclic hydrocarbon groups. $R^{12}$ is selected from substituted or unsubstituted $C_1$-$C_{10}$ alkyl groups, $C_2$-$C_{10}$ alkenyl groups, $C_2$-$C_{10}$ alkynyl groups, $C_3$-$C_{10}$ cumulative dienyl groups, $C_6$-$C_{10}$ aryl groups, $C_3$-$C_{10}$ alicyclic hydrocarbon groups, or heteroatom-containing functional groups.

11 Claims, No Drawings

(51) Int. Cl.
H01M 10/0525 (2010.01)
H01M 10/0567 (2010.01)
H01M 10/0569 (2010.01)

(58) Field of Classification Search
CPC .... H01M 4/525; H01M 4/587; H01M 10/052; C07F 9/5004; Y02E 60/10
See application file for complete search history.

(56) References Cited

U.S. PATENT DOCUMENTS

| | | | |
|---|---|---|---|
| 2022/0052382 A1* | 2/2022 | Peng | H01M 10/0568 |
| 2022/0216515 A1* | 7/2022 | Liu | H01M 4/525 |
| 2022/0223914 A1* | 7/2022 | Peng | C07F 9/5325 |

FOREIGN PATENT DOCUMENTS

| | | |
|---|---|---|
| CN | 109786835 A | 5/2019 |
| CN | 110165219 A | 8/2019 |
| CN | 111342135 A | 6/2020 |
| CN | 111446501 A | 7/2020 |
| CN | 111640986 A | 9/2020 |
| KR | 10-2010-012576 | 12/2010 |
| WO | 2020/092267 | 5/2020 |
| WO | 2020151658 A1 | 7/2020 |

OTHER PUBLICATIONS

Written Opinion for International Application PCT/CN2020/108970 mailed Feb. 25, 2021.
CN 109786835 A dated May 21, 2019 _ English Translation.
CN 111446501 A dated Jul. 24, 2020 _ English Translation.
CN 111342135 A dated Jun. 26, 2020 _ English Translation.
CN 105609874 A dated May 25, 2016 _ English Translation.
CN 110165219 A dated Aug. 23, 2019 _ English Translation.
Office Action (Notice of Reason for Rejection) for Japan Application No. K210418JP0, mailed on Nov. 22, 2022, 3 pages.
Notice of Allowance for Japan Application No. K210418JP0, mailed on Aug. 16, 2023, 3 page.
Office Action (Decision of Rejection) for Japan Application No. K210418JP0, mailed on Mar. 14, 2023, 4 pages.
Office Action for Korea Application No. 20217016625, mailed on Apr. 3, 2023, 7 pages.
International Report on Patentability for Application No. EP 20920769, mailed on Feb. 27, 2023, 5 pages.
Search Opinion for EP2090769, mailed on Mar. 22, 2022, 4 pages.

* cited by examiner

ELECTROLYTE, AND ELECTROCHEMICAL DEVICE AND ELECTRONIC DEVICE COMPRISING THE SAME

This application is the national stage of PCT international application PCT/CN2020/108970, filed on 13 Aug. 2020, the disclosure of which is hereby incorporated by reference in its entirety.

BACKGROUND

1. Field of the Invention

This application relates to the field of energy storage technologies, and in particular, to an electrolyte, and an electrochemical device and an electronic device including the electrolyte.

2. Description of the Prior Art

Electrochemical devices, such as lithium-ion batteries, having advantages such as high energy density, low maintenance, relatively low self-discharge, long cycle life, no memory effect, stable working voltage, and environmental friendliness, have received extensive attention of people and been widely used in the fields such as portable electronic devices (including mobile phones, laptops, cameras and other electronic products), electric power tools, and electric vehicles. However, with rapid development of technologies and the diversity of market demands, people have also put forward more requirements for the power supply of electronic products, such as the requirements of being thinner and lighter, and having more diversified shapes, higher safety, and higher power.

Increasing charging voltage or increasing capacity of active materials is a main method to increase energy density of batteries, which, however, both accelerate decomposition of an electrolyte and lead to gas production in the batteries. How to stabilize high-valence transition metals and inhibit the decomposition of the electrolyte is a technical problem to be solved urgently in the prior art.

SUMMARY

This application provides an electrolyte and an electrochemical device using the electrolyte, to solve at least one problem existing in the related fields. In particular, the electrolyte provided by this application can significantly improve high-temperature performance and floating performance of electrochemical devices.

This application provides an electrolyte, where the electrolyte includes at least a compound of formula I:

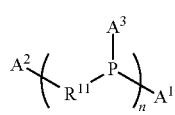

(formula I)

where $A^1$, $A^2$, and $A^3$ are each independently selected from the following formulas I-A, I-B, I-C, or I-D, and the three are not all I-A:

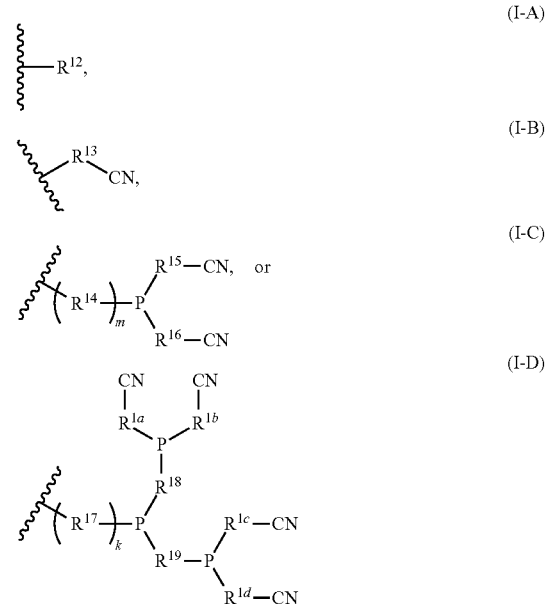

where

represents a binding site for binding to an adjacent atom, where m and k are each independently selected from 0 or 1, and n is selected from integers of 1 to 6, where $R^{11}$, $R^{13}$, $R^{14}$, $R^{15}$, $R^{16}$, $R^{17}$, $R^{18}$, $R^{19}$, $R^{1a}$, $R^{1b}$, $R^{1c}$, and $R^{1d}$ are each independently selected from hydrogen, substituted or unsubstituted $C_1$-$C_{10}$ alkylidene groups, substituted or unsubstituted $C_2$-$C_{10}$ alkenylene groups, substituted or unsubstituted $C_2$-$C_{10}$ alkynylidene groups, substituted or unsubstituted $C_3$-$C_{10}$ cumulative dienyl groups, substituted or unsubstituted $C_6$-$C_{10}$ aryl groups, or substituted or unsubstituted $C_3$-$C_{10}$ alicyclic hydrocarbon groups; and $R^{12}$ is selected from substituted or unsubstituted $C_1$-$C_{10}$ alkyl groups, substituted or unsubstituted $C_2$-$C_{10}$ alkenyl groups, substituted or unsubstituted $C_2$-$C_{10}$ alkynyl groups, substituted or unsubstituted $C_3$-$C_{10}$ cumulative dienyl groups, substituted or unsubstituted $C_6$-$C_{10}$ aryl groups, or substituted or unsubstituted $C_3$-$C_{10}$ alicyclic hydrocarbon groups, or substituted or unsubstituted heteroatom-containing functional groups, where when substitution is performed, substituents are each independently selected from halogens.

In some embodiments, the compound of formula I in the electrolyte includes at least one of the following compounds:

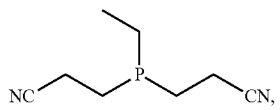

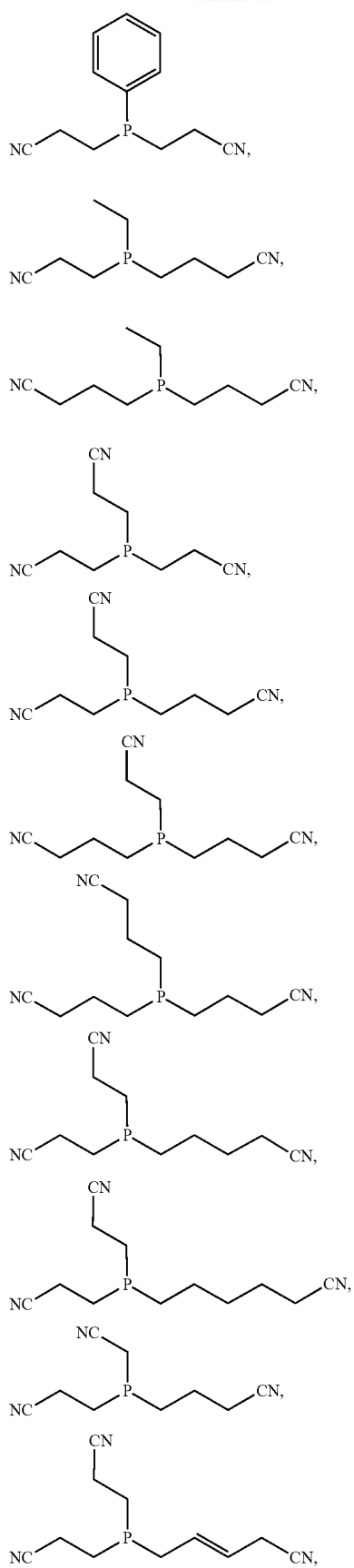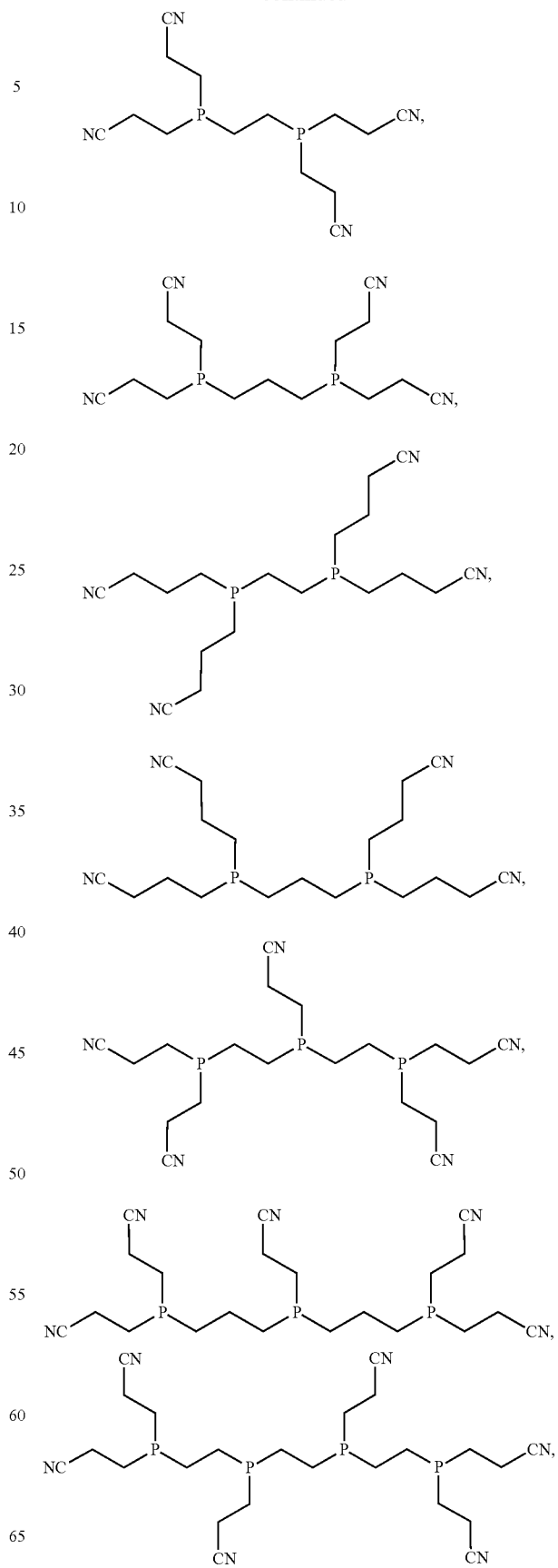

-continued

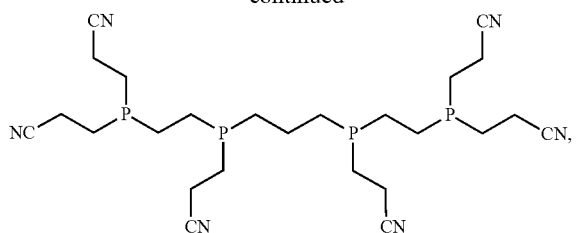

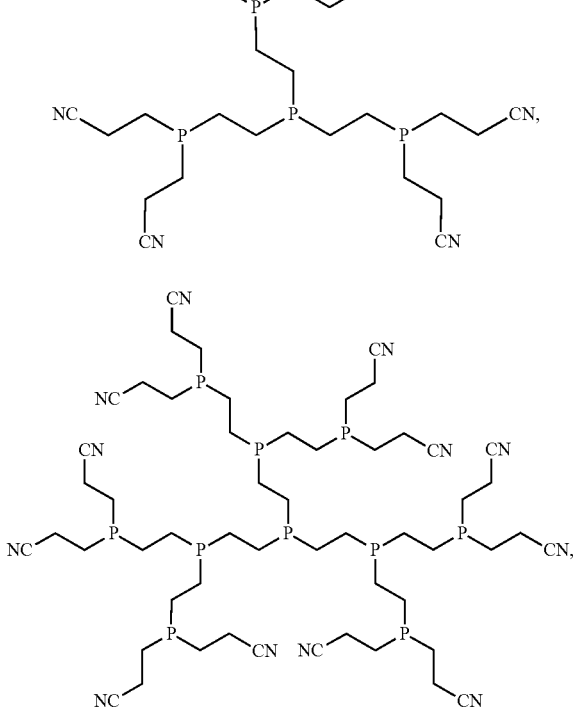

-continued

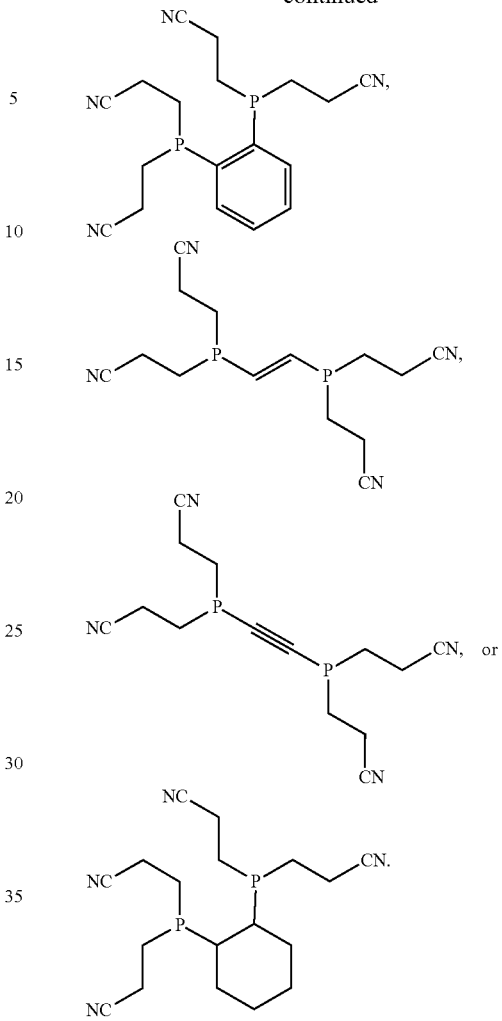

In some embodiments, based on a total weight of the electrolyte, a percentage of the compound of formula I is about 0.01% to 5%.

In some embodiments, the electrolyte of this application further includes a compound containing a sulfur-oxygen double bond, which includes at least one of the following compounds: sulfolane, 1,3-propanesultone, 1,4-butanesulfonate, methylene methanesulfonate, 1,3-propanedisulfonic anhydride, vinyl sulfate, vinyl sulfite, 4-methyl vinyl sulfate, 2,4-butanesulfonate, 2-methyl-1,3-propan sulfonate, 1,3-butanesulfonate, 1-fluoro-1,3-propanesultone, 2-fluoro-1,3-propanesultone, 3-fluoro-1,3-propanesultone, propylene-1,3-sultone, propylene sulfate, propylene sulfite, or fluoroethylene sulfate, where based on a total weight of the electrolyte, a percentage of the compound containing a sulfur-oxygen double bond is 0.01% to 10%.

In some embodiments, the electrolyte of this application further includes a compound containing a P—O bond, which includes at least one of the following compounds: lithium difluorophosphate, lithium difluorobisoxalate, lithium tetrafluoro(oxalato)phosphate, 1,2-bis((difluorophosphino)oxy)ethane, trimethyl phosphate, triphenyl phosphate, triisopropyl phosphate, 3,3,3-trifluoroethyl phosphate, 3,3,3-trifluoroethyl phosphite, tris(trimethylsilane) phosphate, pentafluoroethoxy cyclotriphosphazene, or pentafluoro(phenoxy)cyclotriphosphazene, where based on a total weight of the electrolyte, a percentage of the compound containing a P—O bond is 0.1% to 3%.

In some embodiments, the electrolyte of this application further includes a polynitrile compound, which includes at least one of the following compounds: adiponitrile, succinonitrile, 1,2-bis(2-cyanoethoxy)ethane, 1,2,3-propanetricarbonitrile, 1,3,5-pentanetricarbonitrile, 1,3,6-hexanetricarbonitrile, 1,2,6-hexamethylenetricarbonitrile, or 1,2,3-tris(2-cyanoethoxy)propane.

In some embodiments, based on a total weight of the electrolyte, a percentage of the compound of formula I is a %, a percentage of the polynitrile compound is b %, and a content ratio of the compound of formula I to the polynitrile compound, a/b, is greater than or equal to 0.1 and less than or equal to 80.

This application further provides an electrochemical device, where the electrochemical device includes a positive electrode, a negative electrode, a separator, and an electrolyte according to this application.

In some embodiments, the electrolyte in the electrochemical device further includes a metal element, and the metal element includes at least one of Cu, Co, Ni, or Mn, where the amount of the metal element contained in the electrolyte is less than 1000 ppm.

In some embodiments, a negative electrode in the electrochemical device includes a negative electrode active material, and the negative electrode active material includes a silicon-containing material.

This application further provides an electronic device, including the electrochemical device according to this application.

DESCRIPTION OF EMBODIMENTS

To make the objectives, technical solutions, and advantages of this application clearer, the following clearly and completely describes the technical solutions in this application with reference to the embodiments. Apparently, the described embodiments are some but not all of the embodiments of this application. The embodiments described herein are illustrative in nature and used to provide a basic understanding of this application. The embodiments of this application shall not be construed as a limitation on this application. All other embodiments obtained by those skilled in the art based on the technical solutions provided by this application and the given embodiments without creative efforts shall fall within the protection scope of this application.

The term "about" used herein is intended to describe and represent small variations. When used in combination with an event or a circumstance, the term may refer to an Embodiment in which the exact event or circumstance occurs or an Embodiment in which an extremely similar event or circumstance occurs. For example, when used in combination with a value, the term may refer to a variation range of less than or equal to ±10% of the value, for example, less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, if a difference between two values is less than or equal to ±10% of an average value of the values (for example, less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%), the two values may be considered "about" the same.

In addition, quantities, ratios, and other values are sometimes presented in the format of ranges in this specification. It should be understood that such range formats are used for convenience and simplicity and should be flexibly understood as including not only values clearly designated as falling within the range but also all individual values or sub-ranges covered by the range as if each value and sub-range are clearly designated.

In specific embodiments and claims, a list of items connected by the terms "one of", "one piece of", "one kind of" or other similar terms may mean any one of the listed items. For example, if items A and B are listed, the phrase "one of A and B" means only A or only B. In another Embodiment, if items A, B, and C are listed, the phrase "one of A, B, and C" means only A, only B, or only C. The item A may contain a single element or a plurality of elements. The item B may contain a single element or a plurality of elements. The item C may contain a single element or a plurality of elements.

In the specific embodiments and claims, an item list connected by the terms "at least one of", "at least one piece of", "at least one kind of" or other similar terms may mean any combination of the listed items. For example, if items A and B are listed, the phrase "at least one of A and B" means only A; only B; or A and B. In another Embodiment, if items A, B, and C are listed, the phrase "at least one of A, B, and C" means only A; only B; only C; A and B (exclusive of C); A and C (exclusive of B); B and C (exclusive of A); or all of A, B, and C. The item A may contain a single element or a plurality of elements. The item B may contain a single element or a plurality of elements. The item C may contain a single element or a plurality of elements.

The following definitions are used in this application (unless explicitly stated otherwise).

For simplicity, a "Cn-Cm" group refers to a group having "n" to "m" carbon atoms, where "n" and "m" are integers. For example, a "$C_1$-$C_{10}$" alkyl group is an alkyl group having 1 to 10 carbon atoms.

The term "alkyl group" is intended to be a straight-chain saturated hydrocarbon structure having 1 to 20 carbon atoms. The term "alkyl group" is also intended to be a branched or cyclic hydrocarbon structure having 3 to 20 carbon atoms. For example, the alkyl group may be an alkyl group having 1 to 20 carbon atoms, an alkyl group having 1 to 10 carbon atoms, an alkyl group having 1 to 5 carbon atoms, an alkyl group having 5 to 20 carbon atoms, an alkyl group having 5 to 15 carbon atoms, or an alkyl group having 5 to 10 carbon atoms. References to an alkyl group with a specific carbon number are intended to cover all geometric isomers with the specific carbon number. Therefore, for example, "butyl" is meant to include n-butyl, sec-butyl, isobutyl, tert-butyl, and cyclobutyl; and "propyl" includes n-propyl, isopropyl, and cyclopropyl. Embodiments of the alkyl group include, but are not limited to, a methyl group, an ethyl group, an n-propyl group, an isopropyl group, an cyclopropyl group, an n-butyl group, an isobutyl group, a sec-butyl group, a tert-butyl group, a cyclobutyl group, an n-pentyl group, an isopentyl group, a neopentyl group, a cyclopentyl group, a methylcyclopentyl group, an ethylcyclopentyl group, an n-hexyl group, an isohexyl group, a cyclohexyl group, an n-heptyl group, an octyl group, a cyclopropyl group, a cyclobutyl group, a norbornyl group, and the like. In addition, the alkyl group may be arbitrarily substituted.

The term "alkenyl group" refers to a straight-chain or branched monovalent unsaturated hydrocarbon group having at least one and usually 1, 2, or 3 carbon-carbon double bonds. Unless otherwise defined, the alkenyl group generally contains 2 to 20 carbon atoms. For example, the alkenyl group may be an alkenyl group having 2 to 20 carbon atoms, an alkenyl group having 6 to 20 carbon atoms, an alkenyl group having 2 to 10 carbon atoms, or an alkenyl group having 2 to 6 carbon atoms. Representative alkenyl groups include, for example, vinyl, n-propenyl, isopropenyl, n-but-2-enyl, but-3-enyl, and n-hex-3-enyl. In addition, the alkenyl group may be arbitrarily substituted.

The term "allene group" refers to a straight-chain or branched monovalent unsaturated hydrocarbon group having at least one and usually 1, 2, or 3 carbon-carbon triple bonds. Unless otherwise defined, the alkynyl group generally contains 2 to 20 carbon atoms. For example, the alkynyl group may be an alkynyl group having 2 to 20 carbon atoms, an alkynyl group having 6 to 20 carbon atoms, an alkynyl group having 2 to 10 carbon atoms, or an alkynyl group having 2 to 6 carbon atoms. Representative alkynyl groups include, for example, ethynyl, prop-2-ynyl(n-propynyl), n-but-2-ynyl, and n-hex-3-ynyl. In addition, the alkynyl group may be arbitrarily substituted.

The term "alkylidene group", "alkenylene group" or "alkynylene group" as used herein refers to an alkyl group, an alkenyl group, or an alkynyl group as defined above which is located between two other chemical groups and connects the two other chemical groups. Embodiments of the alkylidene group include, but are not limited to: methylene, ethylene, propylene, and butylene. Embodiments of the alkenylene group include, but are not limited to: vinylene, propenylene, and butenylene. Embodiments of the alkynylene group include, but are not limited to: ethynylene, propynylene, and butynylene.

The term "allene group" means that a pair of adjacent carbon-carbon double bonds is contained in a molecule, that is, one carbon atom is connected to two adjacent carbon atoms through two double bonds, for example,

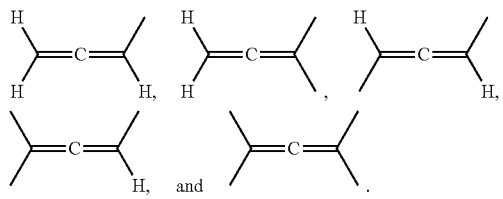

The term "aryl group" means a monovalent aromatic hydrocarbon having a monocyclic (for example, phenyl) or fused ring. Fused ring systems include those ring systems that are fully unsaturated (for example, naphth) and those ring systems that are partially unsaturated (for example, 1,2,3,4-tetrahydronaphthalene). Unless otherwise defined, the alkynyl group generally contains 6 to 26, 6 to 20, 6 to 15, or 6 to 10 carbocyclic atoms and includes, for example, —$C_{6-10}$ aryl group. Representative aryl groups include, for example, phenyl, methylphenyl, propylphenyl, isopropylphenyl, benzyl, naphth-1-yl, and naphth-2-yl.

The term "heterocycle" or "heterocyclic group" means a substituted or unsubstituted 5- to 8-membered monocyclic or bicyclic non-aromatic hydrocarbon, where 1 to 3 carbon atoms are replaced by heteroatoms selected from nitrogen, oxygen, or sulfur atoms. Embodiments include pyrrolidin-2-yl, pyrrolidin-3-yl, piperidinyl, morpholin-4-yl, or the like, which may be subsequently substituted. "Heteroatom" refers to an atom selected from N, O, and S.

"Alicyclic hydrocarbon group" refers to a saturated, partially unsaturated or unsaturated mono-, di-, tri-, or polycyclic hydrocarbon group, which has about 3 to 15 carbons, or 3 to 12 carbons, or 3 to 8 carbons, or 3 to 6 carbons, or 5 or 6 carbons. Embodiments of the alicyclic hydrocarbon group include, but are not limited to: cyclopropyl, cyclobutyl, cyclobutenyl, cyclopentyl, cyclopentenyl, cyclohexyl, cyclohexenyl, cycloheptyl, cyclooctyl, or the like.

As used herein, the term "halogen" may be F, Cl, Br, or I.

As used herein, the term "cyano group" covers organics containing an organic group —CN.

When the foregoing substituents are substituted, substituents may each be selected from a group including a halogen, an alkyl group, an alkenyl group, an aryl group, and heteroaryl.

I. Electrolyte

1. Compound of Formula I

This application provides an electrolyte, where the electrolyte includes at least a compound of formula I:

(formula I)

where $A^1$, $A^2$, and $A^3$ are each independently selected from the following formula I-A, I-B, I-C, or I-D, and the three are not all I-A:

(I-A)

(I-B)

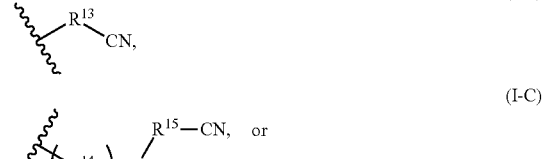

(I-C)

(I-D)

where

represents a binding site for binding to an adjacent atom,
where m and k are each independently selected from 0 or 1, and n is selected from integers of 1 to 6,
where $R^{11}$, $R^{13}$, $R^{14}$, $R^{15}$, $R^{16}$, $R^{17}$, $R^{18}$, $R^{19}$, $R^{1a}$, $R^{1b}$, $R^{1c}$, and $R^{1d}$ are each independently selected from hydrogen, substituted or unsubstituted $C_1$-$C_{10}$ alkylidene groups, substituted or unsubstituted $C_2$-$C_{10}$ alkenylene groups, substituted or unsubstituted $C_2$-$C_{10}$ alkynylidene groups, substituted or unsubstituted $C_3$-$C_{10}$ cumulative dienyl groups, substituted or unsubstituted $C_6$-$C_{10}$ aryl groups, or substituted or unsubstituted $C_3$-$C_{10}$ alicyclic hydrocarbon groups; and
$R^{12}$ is selected from substituted or unsubstituted $C_1$-$C_{10}$ alkyl groups, substituted or unsubstituted $C_2$-$C_{10}$ alkenyl groups, substituted or unsubstituted $C_2$-$C_{10}$ alkynyl groups, substituted or unsubstituted $C_3$-$C_{10}$ cumulative dienyl groups, substituted or unsubstituted $C_6$-$C_{10}$ aryl groups, substituted or unsubstituted $C_3$-$C_{10}$ alicyclic hydrocarbon groups, or substituted or unsubstituted heteroatom-containing functional groups,
where when substitution is performed, substituents are each independently selected from halogens.

In some embodiments, $A^1$, $A^2$, and $A^3$ in the compound of formula I are selected from formula I-A and formula I-B, formula I-B and formula I-C, formula I-A and formula I-C, or all from formula I-B.

In some embodiments, the compound of formula I in the electrolyte includes at least one of the following compounds:

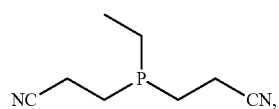
(I-1)

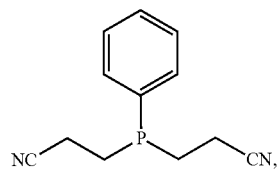
(I-2)

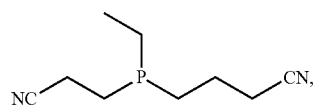
(I-3)

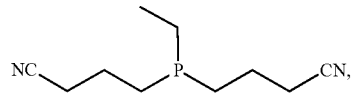
(I-4)

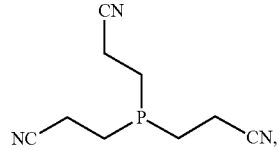
(I-5)

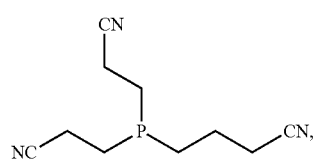
(I-6)

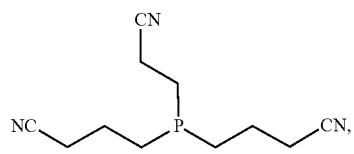
(I-7)

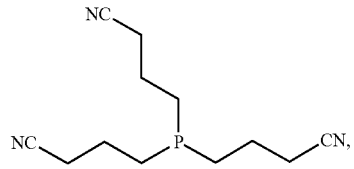
(I-8)

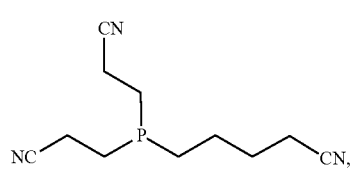
(I-9)

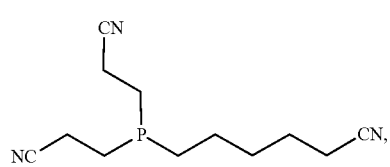
(I-10)

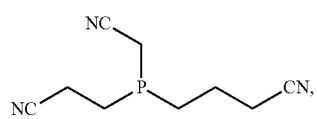
(I-11)

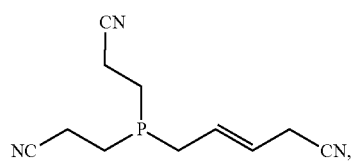
(I-12)

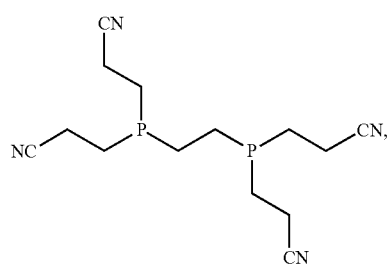
(I-13)

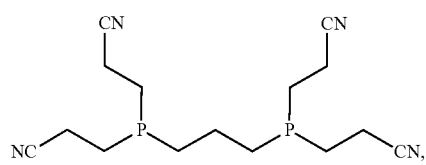
(I-14)

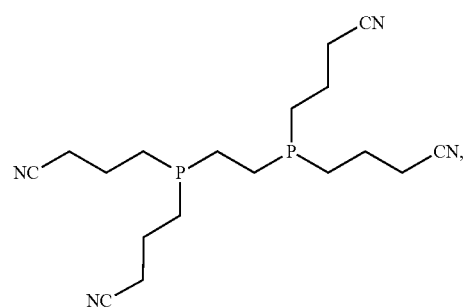
(I-15)
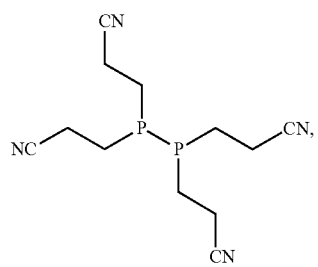
(I-21)
(I-16)
(I-22)
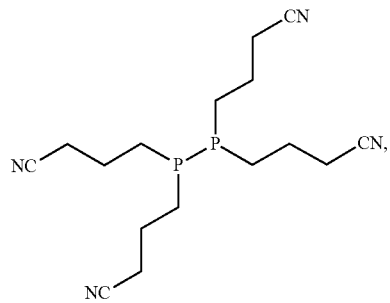
(I-17)
(I-23)
(I-18)
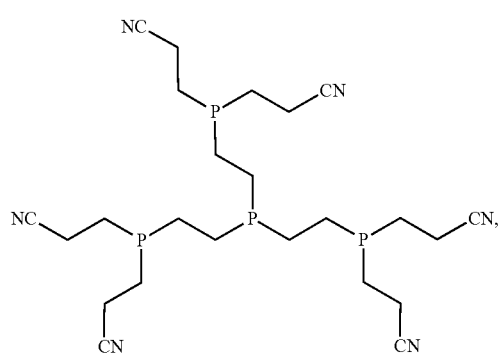
(I-24)
(I-19)
(I-20)
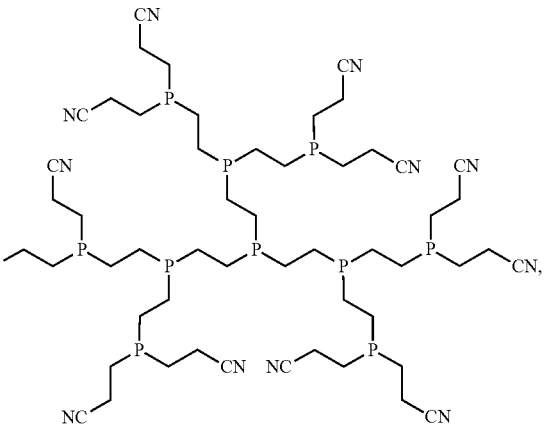
(I-25)
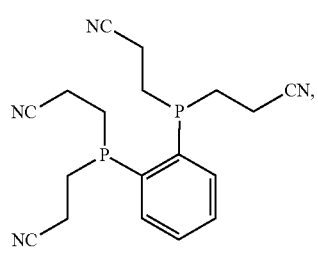

-continued

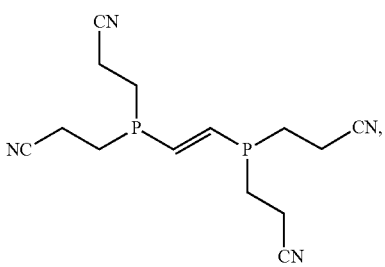 (I-26)

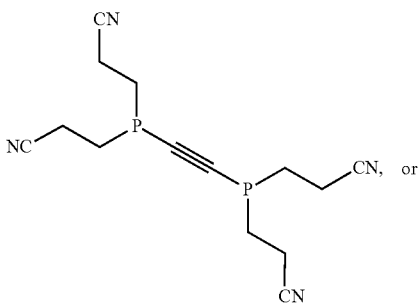 (I-27)

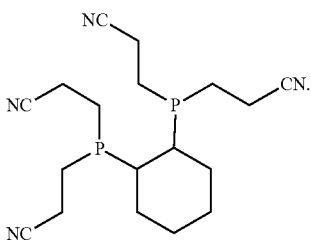 (I-28)

In some embodiments, based on a total weight of the electrolyte, a percentage of the compound of formula I is 0.01% to 5%. For example, a percentage of the compound of formula I may be about 0.01%, about 0.05%, about 0.1%, or about 0.2%, about 0.3%, about 0.4%, about 0.5%, about 0.6%, about 0.7%, about 0.8%, about 0.9%, about 1.0%, about 2.0%, about 3.0%, about 4.0%, or about 5.0%, or a range defined by any two of the above values.

2. Other Additives

In some embodiments, the electrolyte further includes at least one of the following compounds: a compound containing a sulfur-oxygen double bond, a compound containing a P—O bond, a polynitrile compound, or a cyclic carbonate compound.

(1) Compound Containing a Sulfur-Oxygen Double Bond

The electrolyte of this application may further include a compound containing a sulfur-oxygen double bond, and the compound containing a sulfur-oxygen double bond may include at least a compound of formula II-A:

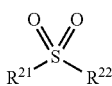 (II-A)

where
R$^{21}$ and R$^{22}$ are each independently selected from substituted or unsubstituted C$_1$-C$_5$ alkyl groups, substituted or unsubstituted C$_1$-C$_5$ alkylidene groups, substituted or unsubstituted C$_2$-C$_{10}$ alkenyl groups, substituted or unsubstituted C$_2$-C$_{10}$ alkynyl groups, substituted or unsubstituted C$_3$-C$_{10}$ alicyclic groups, substituted or unsubstituted C$_6$-C$_{10}$ aryl groups, substituted or unsubstituted C$_1$-C$_6$ heterocyclic groups (the heterocyclic groups include aliphatic heterocyclic groups and aromatic heterocyclic groups), where when substitution is performed, substituents are one or more of a halogen atom or a heteroatom-containing functional group, R$^{21}$ and R$^{22}$ may form a closed ring structure, and the heteroatom-containing functional group is selected from one or more of B, N, O, F, Si, P or S.

In some embodiments, the compound containing a sulfur-oxygen double bond includes, but is not limited to, at least one of the following compounds:

 (II-1)

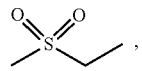 (II-2)

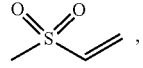 (II-3)

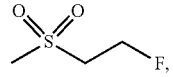 (II-4)

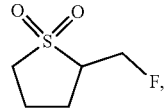 (II-5)

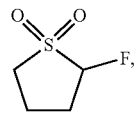 (II-6)

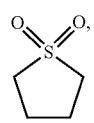 (II-7)

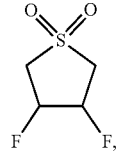 (II-8)

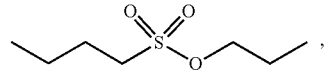 (II-9)

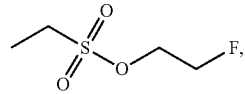 (II-10)

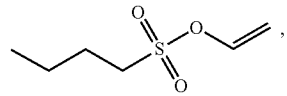 (II-11)

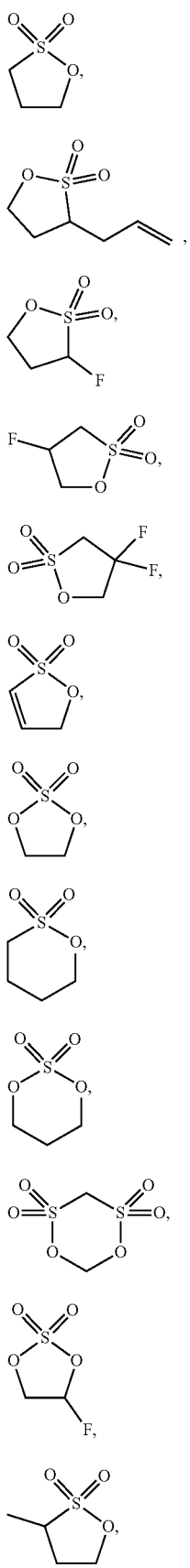
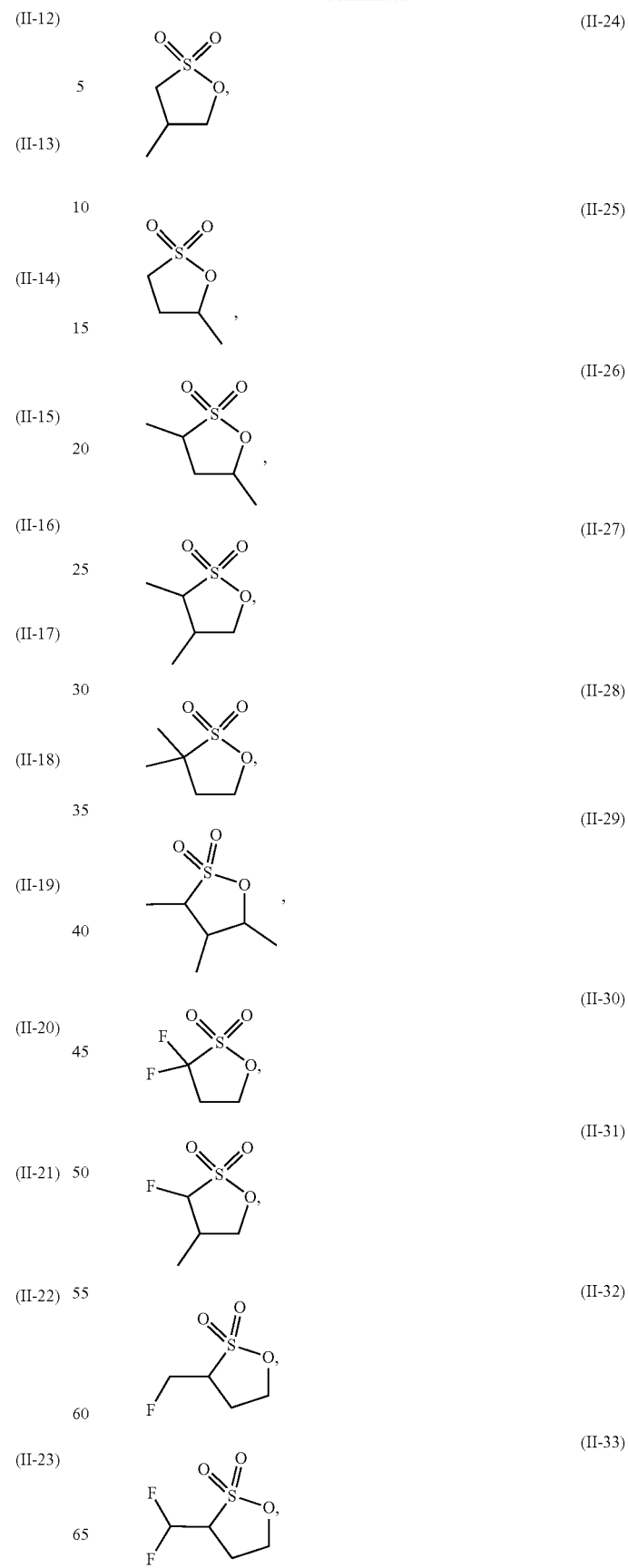

 (II-34)
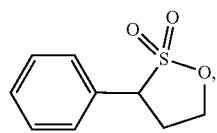 (II-35)
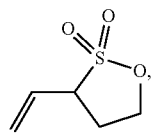 (II-36)
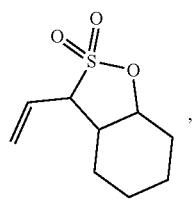 (II-37)
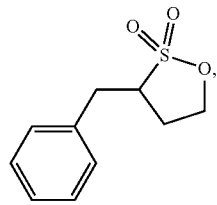 (II-38)
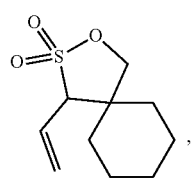 (II-39)
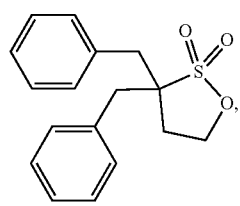 (II-40)
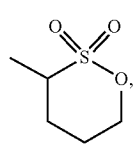 (II-41)
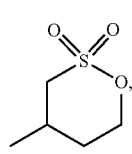 (II-42)
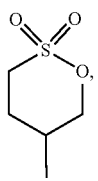 (II-43)
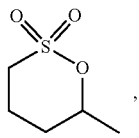 (II-44)
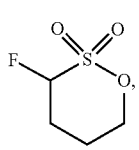 (II-45)
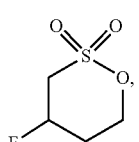 (II-46)
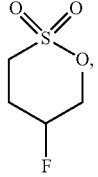 (II-47)
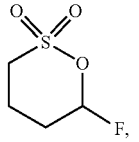 (II-48)
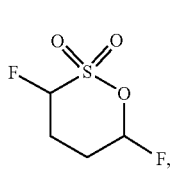 (II-49)
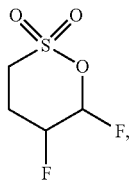 (II-50)
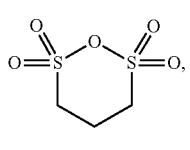 (II-51)
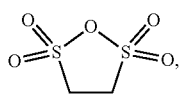 (II-52)

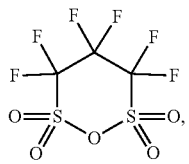
(II-53)

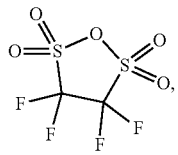
(II-54)

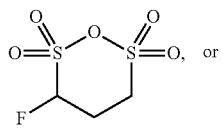
(II-55)

or

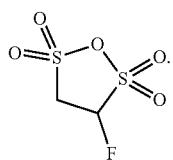
(II-56)

In some embodiments, the compound containing a sulfur-oxygen double bond includes at least one of the following materials: sulfolane, 1,3-propanesultone, 1,4-butanesulfonate, methylene methanesulfonate, 1,3-propanedisulfonic anhydride, vinyl sulfate, vinyl sulfite, 4-methyl vinyl sulfate, 2,4-butanesulfonate, 2-methy l-1,3-propan sulfonate, 1,3-butanesulfonate, 1-fluoro-1,3-propanesultone, 2-fluoro-1,3-propanesultone, 3-fluoro-1,3-propanesultone, propylene-1,3-sultone, propylene sulfate, propylene sulfite, or fluoroethylene sulfate.

In some embodiments, the compound containing a sulfur-oxygen double bond includes at least one of the following materials: sulfolane (II-7), 1,3-propanesultone (II-12), propenyl-1,3-sultone (II-17), vinyl sulfate (II-18), or methylene disulfonate (II-21).

In some embodiments, when the electrolyte includes the compound containing a sulfur-oxygen double bond, based on a total weight of the electrolyte, a percentage of the compound containing a sulfur-oxygen double bond is 0.01% to 10%, more preferably, 0.1% to 8%. For example, a percentage of the compound containing a sulfur-oxygen double bond can be about 0.01%, about 0.05%, about 0.1%, about 0.2%, about 0.3%, about 0.4%, about 0.5%, about 0.6%, about 0.7%, about 0.8%, about 0.9%, about 1.0%, about 2.0%, about 3.0%, about 4.0%, about 5.0%, about 6.0%, about 8.0%, about 9.0%, or about 10.0%, or a range defined by any two of the above values.

The compound containing a sulfur-oxygen double bond according to this application has a strong antioxidant capacity and is not easy to be oxidized in a positive electrode material. In addition, in the case of lithium plating in a negative electrode, the compounds may be reduced on a surface of lithium metal to form a protective film, thereby inhibiting heat generation caused by decomposition of the lithium metal and the electrolyte, and further enhancing protection of an active material.

(2) Compound Containing a P—O Bond

In some embodiments, the electrolyte of this application further includes a compound containing a P—O bond, which includes at least one of the following compounds: lithium difluorophosphate, lithium difluorobisoxalate, lithium tetrafluoro(oxalato)phosphate, 1,2-bis((difluorophosphino) oxy)ethane, trimethyl phosphate, triphenyl phosphate, triisopropyl phosphate, 3,3,3-trifluoroethyl phosphate, 3,3,3-trifluoroethyl phosphite, tris(trimethylsilane) phosphate, pentafluoroethoxy cyclotriphosphazene, or pentafluoro(phenoxy)cyclotriphosphazene.

In some embodiments, based on a total weight of the electrolyte, a percentage of the compound containing a P—O bond is 0.1% to 3%. For example, a percentage of the compound containing a P—O bond may be about 0.1%, about 0.2%, about 0.3%, or about 0.4%, about 0.5%, about 0.6%, about 0.7%, about 0.8%, about 0.9%, about 1.0%, about 1.5%, about 2.0%, about 2.5%, or about 3.0%, or a range defined by any two of the above values.

(3) Polynitrile Compound

In some embodiments, the electrolyte of this application further includes a polynitrile compound, which includes at least one of a dinitrile or trinitrile compound. In some embodiments, the polynitrile compound includes, but is not limited to, at least one of the following materials: adiponitrile, succinonitrile, 1,2-bis(2-cyanoethoxy)ethane, 1,2,3-propanetricarbonitrile, 1,3,5-pentanetricarbonitrile, 1,3,6-hexanetricarbonitrile, 1,2,6-hexamethylenetricarbonitrile, or 1,2,3-tris(2-cyanoethoxy)propane.

In some embodiments, the polynitrile compound includes at least one of the following materials: 1,2,3-tris(2-cyanoethoxy)propane (TCEP), 1,3,6-hexamethylenetricarbonitrile (HTCN), 1,2-bis(2-cyanoethoxy)ethane (DENE) or adiponitrile (ADN), a structure of which is as follows:

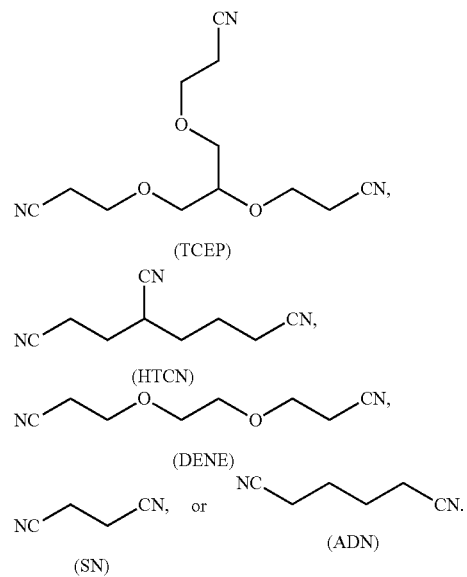

In some embodiments, when the electrolyte includes the polynitrile compound, a mass ratio of the compound of formula I with respect to the polynitrile compound is greater than or equal to 0.1 and less than or equal to 80. For example, the mass ratio of the compound of formula I with respect to the polynitrile compound can be about 0.1, about 0.15, about 0.2, about 0.25, about 0.3, about 0.4, about 0.5, about 0.6, about 0.7, about 0.8, about 0.9, about 1.0, about 1.5, about 2, about 3, about 4, about 5, about 6, about 7, about 8, about 9, about 10, about 12, about 15, about 18, about 20, about 25, about 28, about 30, about 35, about 40, about 45, about 50, about 60, about 70, about 80, or a range defined by any two of the above values.

(4) Cyclic Carbonate Additive

In some embodiments, the electrolyte may further include a cyclic carbonate additive, which includes at least a compound of formula III:

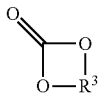

(III)

where $R^3$ is selected from substituted $C_1$-$C_6$ alkylidene groups or substituted or unsubstituted $C_2$-$C_6$ alkenylene groups. When substitution is performed, substituents are selected from halogens, $C_1$-$C_6$ alkyl groups or $C_2$-$C_6$ alkenyl groups.

In some embodiments, the cyclic carbonate additive includes, but is not limited to, at least one of the following compounds:

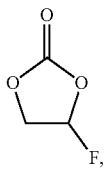

(III-1)

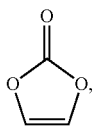

(III-2)

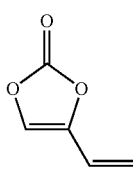

(III-3)

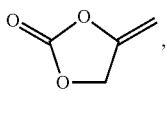

(III-4)

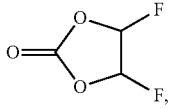

(III-5)

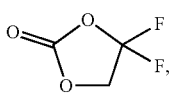

(III-6)

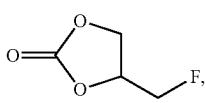

(III-7)

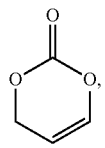

(III-8)

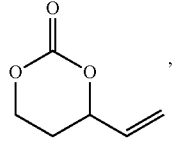

(III-9)

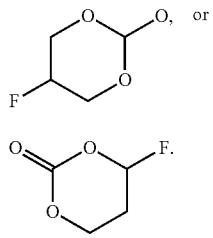

(III-10)

(III-11)

In some embodiments, the cyclic carbonate additive includes at least one of fluoroethylene carbonate (FEC) or vinylene carbonate (VC).

In some embodiments, when the electrolyte includes the cyclic carbonate additive, based on a total weight of the electrolyte, a percentage of the cyclic carbonate additive is 0.01% to 30%. For example, a percentage of the cyclic carbonate additive may be about 0.01%, about 0.05%, about 0.1%, about 0.2%, about 0.3%, about 0.4%, about 0.5%, about 0.6%, about 0.7%, about 0.8%, about 0.9%, about 1.0%, about 2.0%, about 3.0%, about 4.0%, about 5.0%, about 6.0%, about 8.0%, about 9.0%, about 10%, about 15%, about 18%, about 20%, about 25% or about 30%, or a range defined by any two of the above values.

In this application, the combined action of the compound of formula I and the cyclic carbonate additives may further contribute to enhancing stability of a SEI film and may increase flexibility of the SEI film, enhance protection of an active material, and reduce an interfacial contact probability between the active material and the electrolyte, thereby reducing impedance growth caused by an accumulation of by-products during cycling.

(5) Boron-Containing Lithium Salt

In some embodiments, the electrolyte of this application further includes a boron-containing lithium salt, which includes at least one of lithium tetrafluoroborate ($LiBF_4$), lithium bis(oxalato)borate ($LiB(C_2O_4)_2$, LiBOB), or lithium difluoro(oxalato)borate ($LiBF_2(C_2O_4)$, LiDFOB).

In some embodiments, when the electrolyte includes a boron-containing lithium salt, a percentage of the boron-containing lithium salt is 0.01% to 3% based on a total weight of the electrolyte. For example, a percentage of the boron-containing lithium salt may be about 0.01%, about 0.05%, about 0.1%, or about 0.2%, about 0.3%, about 0.4%, about 0.5%, about 0.6%, about 0.7%, about 0.8%, about 0.9%, about 1.0%, about 2.0%, about 3.0%, or a range defined by any two of the above values.

3. Organic Solvent

The electrolyte of this application may further include a non-aqueous organic solvent.

In some embodiments, the non-aqueous organic solvent may include a carbonate, a carboxylate, an ether, or other aprotic solvents. Embodiments of carbonate-based solvents include dimethyl carbonate, diethyl carbonate, methyl ethyl carbonate, methyl propyl carbonate, ethyl propyl carbonate, dipropyl carbonate, and the like. Embodiments of carboxylic acid ester solvents include methyl acetate, ethyl acetate, n-propyl acetate, n-butyl acetate, methyl propionate, ethyl propionate, propyl propionate, butyl propionate, methyl butyrate, ethyl butyrate, propyl butyrate, butyl butyrate, γ-butyrolactone, 2,2-difluoroethyl acetate, valerolactone, butyrolactone, 2-fluoroethyl acetate, 2,2-ethyl difluoroacetate, ethyl trifluoroacetate, ethyl 2,2,3,3,3-pentafluoropropionate, 2,2,3,3,4,4,4,4-heptafluorobutyric acid methyl ester, 4,4,4-trifluoro-3-(trifluoromethyl) butyric acid methyl ester, 2,2,3,3,4,4,5,5,5,5-nonafluorovalerate ethyl ester, 2,2,3,3,4,4,5,5,6,6,7,7,8,8,9,9,9-heptadecafluoromethylnonanoate, 2,2,3,3,4,4,5,5,6,6,7,7,8,8,9,9,9-ethyl heptafluorononanoate, or the like. Embodiments of ether-based solvents include ethylene glycol dimethyl ether, diethylene glycol dimethyl ether, tetraethylene glycol dimethyl ether, dibutyl ether, tetrahydrofuran, 2-methyltetrahydrofuran, bis(2,2,2-trifluoroethyl) ether, and the like.

In some embodiments, one non-aqueous organic solvent or a mixture of a plurality of non-aqueous organic solvents may be used in the electrolyte. When a mixed solvent is used, a mixing ratio may be controlled based on the desired performance of an electrochemical device.

4. Lithium Salt

The electrolyte of this application may further include a lithium salt, which includes or is selected from at least one of an organic lithium salt or an inorganic lithium salt. In some embodiments, the lithium salt includes at least one of fluorine, boron or phosphorus.

In some embodiments, the lithium salt of this application includes or is selected from at least one of lithium hexafluorophosphate ($LiPF_6$), lithium hexafluoroantimonate ($LiSbF_6$), lithium hexafluoroarsenate ($LiAsF_6$), lithium perfluorobutanesulfonate ($LiC_4F_9SO_3$), lithium perchlorate ($LiClO_4$), lithium aluminate ($LiAlO_2$), lithium tetrachloroaluminate ($LiAlCl_4$), lithium bissulfonimide ($LiN(C_xF_{2x+1}SO_2)(C_yF_{2y+1}SO_2)$, where x and y are natural numbers), lithium chloride (LiCl), or lithium fluoride (LiF).

In some embodiments, a concentration of the lithium salt in the electrolyte of this application is 0.5 mol/L to 3 mol/L, 0.5 mol/L to 2 mol/L, or 0.8 mol/L to 1.5 mol/L.

In some embodiments, the electrolyte may include a combination of the following additives: a compound of formula I and a compound containing a sulfur-oxygen double bond; a compound of formula I and a boron-containing lithium salt; a compound of formula I and a polynitrile compound; a compound of formula I, compound containing a sulfur-oxygen double bond and boron-containing lithium salt; formula I compound, compound containing a sulfur-oxygen double bond and polynitrile compound; and a formula I compound, polynitrile compound and boron-containing lithium salt.

In some embodiments, the electrolyte includes a compound of formula I and an additive of at least one of the following compounds: 1,3-propanesultone, sulfolane, vinyl sulfate, methylene methylenedisulfonate, lithium tetrafluoroborate, lithium difluoro(oxalato)borate, lithium difluorophosphate, lithium tetrafluoro(oxalato)phosphate, fluoroethylene carbonate, or vinylene carbonate.

II. Electrochemical Device

This application further provides an electrochemical device, where the electrochemical device includes a positive electrode, a negative electrode, a separator, and an electrolyte according to this application.

In some embodiments, the electrolyte in the electrochemical device further includes a metal element, and the metal element includes at least one of Cu, Co, Ni, or Mn. In some embodiments, the amount of the metal element contained in the electrolyte is less than 1000 ppm.

In this application, a compound of formula I or the combined action of a compound of formula I and at least one of a compound containing a sulfur-oxygen double bond, a compound containing a P—O bond, and a polynitrile compound can effectively inhibit leaching of metals from a positive electrode current collector and a negative electrode current collector, maintains structural stability of a positive electrode active material, and inhibits corrosion of the negative electrode current collector (for example, a copper foil).

(1) Positive Electrode

A positive electrode of the electrochemical device according to this application includes a current collector and a positive electrode active material layer provided on the current collector. The positive electrode active material layer includes a positive electrode active material, and the positive electrode active material includes a compound that reversibly intercalates and deintercalates a lithium ion (namely, a lithiated intercalation compound). The positive electrode active material may include lithium and a composite oxide selected from at least one of cobalt, manganese, and nickel.

The foregoing compound as the positive electrode active material may have a coating layer disposed on a surface, or may be mixed with a compound having the coating layer. The coating layer may include at least one compound of a coating element selected from oxides of the coating element, hydroxides of the coating element, hydroxyl oxides of the coating element, oxycarbonates (oxycarbonate) of the coating element, and hydroxyl carbonates (hydroxyl carbonate) of the coating element. The compound used for the coating layer may be amorphous or crystalline. In some embodiments, the coating element used for the coating layer may include Mg, Al, Co, K, Na, Ca, Si, Ti, V, Sn, Ge, Ga, B, As, Zr, or a mixture thereof. The coating layer may be formed by any method, as long as the inclusion of the element in the compound does not negatively affect the properties of the positive electrode active material. For example, the method may include any coating method known to those skilled in the art, for example, spraying and dipping.

The positive electrode active material layer may include a binder and a conductive material. The binder improves bonding performance of positive electrode active material particles to each other and between the positive electrode active material particles and the current collector. In some embodiments, non-limiting Embodiments of the binder include polyvinyl alcohol, carboxymethyl cellulose, hydroxypropyl cellulose, diacetyl cellulose, polyvinyl chloride, carboxylated polyvinyl chloride, polyvinyl fluoride, a polymer containing ethylene oxide, polyvinylpyrrolidone, polyurethane, polytetrafluoroethylene, polyvinylidene fluoride, polyethylene, polypropylene, styrene-butadiene rubber, acrylic (ester) styrene-butadiene rubber, epoxy resin, nylon, and the like.

The conductive material is used to provide conductivity to an electrode. The conductive material may include any conductive material that causes no undesired chemical change. In some embodiments, Embodiments of the conductive material include one or a mixture of conductive materials such as natural graphite, artificial graphite, carbon black, acetylene black, Ketjen black, carbon fiber, metal powder or metal fiber such as copper, nickel, aluminum, silver, or the like, or polyphenylene derivatives. The current collector may include aluminum, but is not limited thereto.

In some embodiments, a compacted density of the positive electrode active material layer is 3.2 g/cm³ to 4.5 g/cm³.

In some embodiments, the positive electrode active material includes a lithium cobalt oxide, and the compacted density of the positive electrode active material layer is 3.8 g/cm³ to 4.5 g/cm³. For example, the compaction density of the positive electrode active material layer may be about 3.8 g/cm³, about 3.85 g/cm³, about 3.9 g/cm³, about 4.0 g/cm³, about 4.1 g/cm³, about 4.15 g/cm³, about 4.2 g/cm³, about 4.3 g/cm³, about 4.5 g/cm³, or a range defined by any two of the above values.

(2) Negative Electrode

In some embodiments, a negative electrode of the electrochemical device includes a current collector and a negative electrode active material layer formed on the current collector, where the negative electrode active material layer includes a negative electrode active material, and the negative electrode active material may include a material that reversibly intercalates or deintercalates a lithium ion, lithium metal, a lithium metal alloy, a material capable of doping or dedoping lithium, or a transition metal oxide. The material that reversibly intercalates and deintercalates a lithium ion may be a carbon material. The carbon material may be any carbon-based negative electrode active material commonly used in a lithium-ion rechargeable electrochemical device. Embodiments of the carbon material include crystalline carbon, amorphous carbon, and combinations thereof. The crystalline carbon may be amorphous or plate-shaped, flake-shaped, spherical or fiber-shaped natural graphite or artificial graphite. The amorphous carbon may be soft carbon, hard carbon, a mesophase pitch carbonization product, burnt coke, or the like. Both low crystalline carbon and high crystalline carbon can be used as the carbon material. The low crystalline carbon material may generally include soft carbon and hard carbon. The high crystalline carbon material may generally include natural graphite, crystalline graphite, pyrolytic carbon, a mesophase pitch-based carbon fiber, mesophase carbon microbeads, mesophase pitch, and high-temperature calcined carbon (for example, petroleum or coke derived from coal tar pitch).

The negative electrode active material layer may include a binder, and the binder may include various binder polymers, for example, difluoroethylene-hexafluoropropylene (PVDF-co-HFP), polyvinylidene fluoride, polyacrylonitrile, polymethyl methacrylate, polyvinyl alcohol, carboxymethyl cellulose, hydroxypropyl cellulose, polyvinyl chloride, carboxylated polyvinyl chloride, polyvinyl fluoride, a polymer containing ethylene oxide, polyvinylpyrrolidone, polyurethane, polytetrafluoroethylene, polyethylene, polypropylene, styrene-butadiene rubber, acrylic tester) styrene-butadiene rubber, epoxy resin, and nylon, but not limited to thereto.

The negative electrode active material layer may further include a conductive material to improve conductivity of an electrode. Any conductive material that causes no undesired chemical change can be used as the conductive material. In some embodiments, Embodiments of the conductive material include: a carbon-based material such as natural graphite, artificial graphite, carbon black, acetylene black, Ketjen black, and carbon fiber; a metal-based material such as metal powder or metal fiber including copper, nickel, aluminum, silver; a conductive polymer such as a polyphenylene derivative; or any mixture thereof. In some embodiments, the current collector may be copper foil, nickel foil, stainless steel foil, titanium foil, nickel foam, copper foam, a polymer substrate coated with a conductive metal, or a combination thereof.

In some embodiments, the negative electrode active material includes a silicon-containing material. In some embodiments, the negative electrode active material includes a silicon-oxygen composite.

In some embodiments, an average particle diameter of the negative electrode active material particles in the electrochemical device is 5 µm to 22 µm.

In some embodiments, particles of the negative electrode active material in the electrochemical device have a specific surface area of 1 m²/g to 50 m²/g.

In some embodiments, the silicon-oxygen composite $SiO_x$ (0<x<2) is a porous silicon-based negative electrode active material.

In some embodiments, the porous $SiO_x$ particle silicon-based negative electrode active material may also include at least one of $Li_2SiO_3$ or $Li_4SiO_4$.

In some embodiments, a compacted density of the negative electrode active material layer is 1.4 g/cm³ to 2.0 g/cm³. For example, the compacted density of the negative electrode active material layer may be about 1.4 g/cm³, about 1.5 g/cm³, about 1.6 g/cm³, about 1.65 g/cm³, about 1.7 g/cm³, about 1.75 g/cm³, about 1.8 g/cm³, about 1.9 g/cm³, about 2.0 g/cm³, or a range defined by any two of the above values.

(3) Separator

In some embodiments, a separator of the electrochemical device includes a polyolefin-based porous film, a coating (applied on a surface of the polyolefin-based porous film), and a polymer binder.

In some embodiments, the separator includes a monolayer or multilayer polyolefin-based porous film including one or more of polyethylene (PE), ethylene-propylene copolymers, polypropylene (PP), ethylene-butene copolymer, ethylene-hexene copolymers, or ethylene-methyl methacrylate copolymers.

In some embodiments, a coating of the separator includes inorganic ceramic particles and an organic material, where the organic material in the coating includes at least one of polyvinylidene fluoride, vinylidene fluoride-hexafluoropropylene copolymer, polyacrylonitrile, and polyimide, acrylonitrile-butadiene copolymer, acrylonitrile-styrene-butadiene copolymer, polymethyl methacrylate, polymethyl acrylate, polyethyl acrylate, acrylic acid-styrene copolymer, polydimethylsiloxane, sodium polyacrylate, or sodium carboxymethyl cellulose, and the inorganic ceramic particles in the coating include at least one of $SiO_2$, $Al_2O_3$, $CaO$, $TiO_2$, $ZnO_2$, $MgO$, $ZrO_2$, or $SnO_2$.

In some embodiments, a polymer in the coating includes polyvinylidene fluoride.

In some embodiments, a charge cut-off voltage of the electrochemical device of this application is 4.2V and above.

III. Electronic Device

This application further provides an electronic device, including the electrochemical device according to this application.

The electrochemical device according to this application is applicable to electronic devices in various fields. The electrochemical device according to this application is not particularly limited to any purpose, and may be used for any known purposes in the prior art. In one embodiment, the electrochemical device of this application may be used for, but is not limited to, the following electronic devices: a notebook computer, a pen-input computer, a mobile computer, an electronic book player, a portable telephone, a portable fax machine, a portable copier, a portable printer, a stereo headset, a video recorder, a liquid crystal television, a portable cleaner, a portable CD player, a mini-disc, a transceiver, an electronic notebook, a calculator, a memory card, a portable recorder, a radio, a standby power source, a motor, an automobile, a motorcycle, a motor bicycle, a bicycle, a lighting appliance, a toy, a game console, a clock, an electric tool, a flash lamp, a camera, a large household battery, a lithium-ion capacitor, or the like.

This application has achieved unexpected technical effects: The compound of formula I provided in this application can stabilize a high-valence transition metal of the positive electrode, and can enhance stability of the high-valence transition metal of the positive electrode due to inclusion of an increased amount of cyano groups and the presence of phosphorus in a material structure. Therefore, the electrolyte of this application significantly improves high-temperature storage performance of electrochemical devices (for example, lithium-ion batteries).

EMBODIMENTS

This application is further described with reference to Embodiments. It should be understood that these Embodiments are merely used to describe this application but not to limit the scope of this application.

Embodiment I

1. Synthesis of Compound 1-13

Tris(2-cyanoethyl)phosphine (38.64 g, 0.2 mol) and 150 mL of n-butanol were added into a 500 mL three-necked flask, and heated to reflux. After complete dissolution, 16.9 g (0.09 mol) of 1,2-dibromoethane was slowly added and stirred to form a mixture. The mixture was heated to reflux for a total of 24 hours, and filtered while it was hot to collect a precipitate. Then the precipitate was dried, and recrystallized with acetonitrile to obtain 47.3 g of ethylene-bis[tri-(2-cyanoethyl)-phosphonium bromide].

Sodium metal (3.8 g) was dissolved in 200 mL of anhydrous ethanol, and the solution was cooled to 25° C. 47.3 g of ethylene-bis[tris-(2-cyanoethyl)-phosphonium bromide] was added to a sodium ethoxide solution to form a mixture, and the mixture was refluxed for 2 hours. Then a reaction mixture was concentrated, filtered and washed with ice water to remove sodium bromide, and recrystallized with acetone aqueous solution to obtain 18.2 g of 3,3',3'',3'''-(ethane-1,2-diylbis(phosphinetriyl)) tetrapropionitrile (I-13).

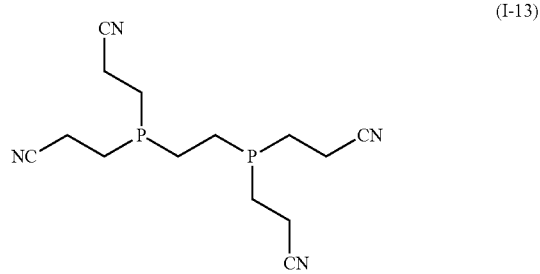 [SMILES: N#CCCP(CCC#N)CCP(CCC#N)CCC#N]

(I-13)

2. Synthesis of Compound 1-21

2.8 g of bis(β-cyanoethyl)phosphine, 1.9 g of pyridine, and 40 mL of chloroform were added into a 100 mL round-bottom flask, and 3.5 g of bis(β-cyanoethyl)phosphine chloride was added at 0° C. After the reaction for 2 h, the mixture was extracted twice with 20 mL water each time, dried, removed chloroform, and recrystallized with acetone-water to obtain 2.7 g of 3,3',3'',3'''-(diphosphine-1,1,2,2-tetrayl)tetrapropionitrile (I-21).

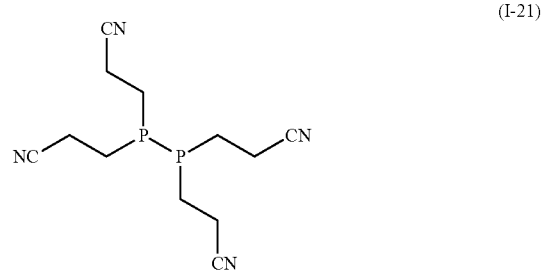 [SMILES: N#CCCP(CCC#N)P(CCC#N)CCC#N]

(I-21)

Embodiment II

1. Preparation Method
(1) Preparation of an Electrolyte

Basic electrolyte 1: In an argon atmosphere glove box with a water content less than 10 ppm, ethylene carbonate (EC for short), propylene carbonate (PC for short), diethyl carbonate (DEC for short), ethyl propionate (EP for short) and propyl propionate (PP for short) were well mixed at a mass ratio of 1:1:1:1:1, and then fully dried lithium salt $LiPF_6$ (1 mol/L) was dissolved in the foregoing mixture to obtain basic electrolyte 1.

Basic electrolyte 2: In an argon atmosphere glove box with a water content less than 10 ppm, ethylene carbonate (EC for short), propylene carbonate (PC for short), and diethyl carbonate (DEC for short) were well mixed at a mass ratio of 3:3:4, and then fully dried lithium salt $LiPF_6$ (1 mol/L) was dissolved in the foregoing mixture to obtain basic electrolyte 2.

Basic electrolyte 3: In an argon atmosphere glove box with a water content less than 10 ppm, ethylene carbonate (EC for short), propylene carbonate (PC for short), diethyl carbonate (DEC for short), and ethyl propionate (EP for short) were well mixed at amass ratio of 1:2:6:1, and then fully dried lithium salt $LiPF_6$ (1 mol/L) was dissolved in the foregoing mixture to obtain basic electrolyte 3.

The compound of formula I according to this application, other compounds, or combinations thereof were added to each of the foregoing basic electrolytes to obtain electrolytes of various Embodiments. The types and contents of specific additives are provided in the table below.

(2) Preparation of a Positive Electrode

Positive electrode 1: NCM811 ($LiNi_{0.8}Mn_{0.1}Co_{0.1}O_2$), acetylene black as a conductive agent, and polyvinylidene fluoride (PVDF for short) as a binder were fully stirred and mixed in an appropriate amount of N-methylpyrrolidone (NMP for short) solvent at a weight ratio of 96:2:2, to form a uniform positive electrode slurry; and the slurry was applied on an aluminum foil of a positive current collector, followed by drying, cold pressing, and tab welding, to obtain positive electrode 1, where a compacted density of the positive electrode 1 was 3.50 g/cm$^3$.

Positive electrode 2: LCO ($LiCoO_2$), conductive carbon black, a conductive slurry, and polyvinylidene fluoride (PVDF for short) as a binder were fully stirred and mixed in an appropriate amount of N-methylpyrrolidone (NMP for short) solvent at a weight ratio of 97.9:0.4:0.5:1.2, to form a uniform positive electrode slurry; and the slurry was applied on an aluminum foil of a positive electrode current collector, followed by drying, cold pressing, and tab welding, to obtain positive electrode 2, where a compacted density of the positive electrode 2 was 4.15 g/cm³.

(3) Preparation of a Negative Electrode

Negative electrode 1: A graphite, styrene-butadiene rubber (SBR for short) as a binder, and sodium carboxymethyl cellulose (CMC for short) as a thickener were fully stirred and mixed in an appropriate amount of deionized water at a weight ratio of 97.4:1.4:1.2, to form a uniform negative electrode slurry; and the slurry was applied on a copper foil of a negative electrode current collector, followed by drying, cold pressing, and tab welding, to obtain negative electrode 1, where a compacted density of the negative electrode 1 was 1.80 g/cm³ and graphite $D_v50$ was 10 μm.

Negative electrode 2: Graphite, a silicon material (SiO), sodium carboxymethyl cellulose (CMC), and modified polyacrylic acid were fully stirred and mixed in an appropriate amount of deionized water at a weight ratio of 87:10:0.6:2.4, to form a uniform negative electrode slurry; and the slurry was applied on a copper foil of a negative electrode current collector, followed by drying, cold pressing, and tab welding, to obtain negative electrode 2, where a compacted density of the negative electrode 2 was 1.70 g/cm³ and a $D_v50$ of a mixture of the graphite and silicon material was 17 μm.

(4) Separator

In the Embodiments, a single-layer PE porous polymer film was used as a separator (S), with a thickness of 5 microns and a porosity of 39%. The separator included an inorganic coating and an organic material, where the inorganic coating was $Al_2O_3$ and the organic material was polyvinylidene fluoride.

(5) Preparation of a Lithium-Ion Battery

A positive electrode, a separator, and a negative electrode were laminated in order, so that the separator was located between the positive electrode and the negative electrode for isolation, followed by winding to obtain a bare cell, and placing the bare cell in an outer packaging foil; the prepared electrolyte was injected into a dried battery to complete the preparation of the lithium-ion battery after processes such as vacuum packaging, standing, chemical conversion, and shaping.

2. Test Method and Test Result

Embodiments 1 to 80 and Comparative Embodiments 1 to 5

In Embodiments 1 to 80 and Comparative Embodiments 1 to 5, a lithium-ion battery was prepared based on the method described above by using basic electrolyte 1, positive electrode 2, and negative electrode 1, and performed a cycle test and a high temperature storage test. The specific test method is as follows:

Cycle test process at 25° C.: At 25° C., a battery was charged at 0.7 C to 4.45V, and charged at a constant voltage of 4.45V to 0.05 C. Then the battery was discharged at a current of 1 C to 3.0V, a capacity of the lithium-ion battery was tested and denoted as $C_0$. The lithium-ion battery was charged at a current of 1.5 C to a voltage of 4.45V, and then discharged at a current of 1 C to 3.0V, which was taken as a cycle, and the capacity of the lithium-ion battery was tested by performing 800 cycles and denoted as C. A cycle capacity retention rate was calculated according to the following formula:

Cycle capacity retention rate (%)=$(C-C_0)/C_0 \times 100\%$.

Float charge test process at 45° C.: At 25° C., a battery was discharged at 0.5 C to 3.0V, then charged at 0.5 C to 4.45V, and charged at a constant voltage of 4.45V to 0.05 C. A thickness of the lithium-ion battery was tested and recorded as $D_0$. The lithium-ion battery was placed in an oven at 45° C. and charged at a constant voltage of 4.45V for 42 days, and then the thickness was measured and denoted as D. The thickness expansion rate of the floating charge was calculated according to the following formula:

Thickness swelling rate in floating charge (%)=$(D-D_0)/D_0 \times 100\%$.

High-temperature storage test process at 85° C.: At 25° C., a battery was charged to 4.45V at a constant current of 0.5 C and then constant-voltage charged to 0.05 C, and a thickness of the lithium-ion battery was measured and denoted as $D_1$; and the battery was placed in an oven at 85° C. for 24 h, and then the thickness of the battery was measured and denoted as $D_2$. Thickness swelling rate of the lithium-ion battery after high-temperature storage for 24 h was calculated according to the following formula:

Thickness swelling rate (%)=$(D_2-D_1)/D_1 \times 100\%$.

The specific test results are shown below.

TABLE 1

Electrolytes and test results of Embodiments 1 to 34 and Comparative Embodiment 1

| Embodiment | Compound of formula I | | Compound containing a sulfur-oxygen double bond | | | Thickness swelling rate in floating charge at 45° C. | High-temperature storage thickness swelling rate |
|---|---|---|---|---|---|---|---|
| | Structural formula | Content (wt %) | II-12 (wt %) | II-18 (wt %) | II-21 (wt %) | | |
| Embodiment 1 | I-5 | 0.1 | | | | 35.7% | 19.9% |
| Embodiment 2 | I-5 | 0.2 | | | | 25.3% | 16.6% |
| Embodiment 3 | I-5 | 0.3 | | | | 18.9% | 14.2% |
| Embodiment 4 | I-5 | 0.5 | | | | 15.8% | 13.0% |
| Embodiment 5 | I-5 | 1 | | | | 12.7% | 11.3% |
| Embodiment 6 | I-5 | 1.5 | | | | 12.5% | 11.0% |
| Embodiment 7 | I-5 | 2 | | | | 12.9% | 11.7% |
| Embodiment 8 | I-5 | 3 | | | | 13.6% | 13.1% |
| Embodiment 9 | I-5 | 5 | | | | 16.3% | 13.7% |
| Embodiment 10 | I-1 | 0.5 | | | | 16.3% | 17.0% |
| Embodiment 11 | I-7 | 0.5 | | | | 14.2% | 12.1% |
| Embodiment 12 | I-10 | 0.5 | | | | 14.9% | 12.3% |

TABLE 1-continued

Electrolytes and test results of Embodiments 1 to 34 and Comparative Embodiment 1

| Embodiment | Compound of formula I Structural formula | Compound of formula I Content (wt %) | Compound containing a sulfur-oxygen double bond II-12 (wt %) | Compound containing a sulfur-oxygen double bond II-18 (wt %) | Compound containing a sulfur-oxygen double bond II-21 (wt %) | Thickness swelling rate in floating charge at 45° C. | High-temperature storage thickness swelling rate |
|---|---|---|---|---|---|---|---|
| Embodiment 13 | I-11 | 0.5 | | | | 17.5% | 14.9% |
| Embodiment 14 | I-13 | 0.5 | | | | 15.5% | 12.6% |
| Embodiment 15 | I-19 | 0.3 | | | | 17.9% | 13.8% |
| Embodiment 16 | I-21 | 0.5 | | | | 17.2% | 13.5% |
| Embodiment 17 | I-5 | 0.5 | 3 | | | 13.9% | 11.6% |
| Embodiment 18 | I-5 | 0.5 | 1 | | | 14.2% | 12.7% |
| Embodiment 19 | I-5 | 0.5 | 0.8 | | | 14.9% | 12.3% |
| Embodiment 20 | I-5 | 0.5 | 3 | | 0.5 | 10.8% | 11.5% |
| Embodiment 21 | I-5 | 0.5 | 4 | 0.5 | | 10.6% | 11.2% |
| Embodiment 22 | I-5 | 0.5 | 2 | 1 | | 10.1% | 11.4% |
| Embodiment 23 | I-5 | 0.5 | 3 | 2 | 0.5 | 9.3% | 11.0% |
| Embodiment 24 | I-5 | 0.5 | 3 | 1 | 0.5 | 9.0% | 9.8% |
| Embodiment 25 | I-5 | 0.5 | 4 | 3 | 1 | 11.7% | 12.5% |
| Embodiment 26 | I-5 | 0.5 | 5 | 3 | 2 | 14.5% | 14.1% |
| Embodiment 27 | I-5 | 0.5 | 4 | 0.5 | 0.5 | 10.7% | 11.6% |
| Embodiment 28 | I-1 | 0.5 | 4 | 0.5 | | 14.0% | 15.2% |
| Embodiment 29 | I-7 | 0.5 | 4 | 0.5 | | 10.5% | 11.1% |
| Embodiment 30 | I-10 | 0.5 | 4 | 0.5 | | 10.4% | 10.7% |
| Embodiment 31 | I-11 | 0.5 | 4 | 0.5 | | 11.6% | 11.3% |
| Embodiment 32 | I-13 | 0.5 | 4 | 0.5 | | 10.2% | 10.6% |
| Embodiment 33 | I-19 | 0.3 | 4 | 0.5 | | 10.3% | 10.0% |
| Embodiment 34 | I-21 | 0.5 | 4 | 0.5 | | 10.3% | 10.6% |
| Comparative Embodiment 1 | | | 4 | 0.5 | | 54.7% | 22.6% |

It could be seen from the Embodiments and comparative Embodiments in Table that the compound of formula I according to this application could significantly improve the floating charge and the high-temperature storage performance of the battery. The above test results showed that when a percentage of the compound of formula I is between 0.01 wt % and 10 wt %, the compounds of formula I provided in this application can stabilize a high-valence transition metal, thereby improving performance of electrochemical devices.

In Embodiments 18 to 34, a compound containing a sulfur-oxygen double bond was additionally added. The test results showed that the combined action of the compound of formula I of this application and the compound containing a sulfur-oxygen double bond can further improve the high-temperature storage performance of electrochemical devices.

TABLE 2

Electrolytes and test results of Embodiments 4, and 35 to 49

| Embodiment | Compound of formula I Structural formula | Compound of formula I Content (wt %) | Boron-containing lithium salt $LiBF_4$ (wt %) | Boron-containing lithium salt LiDFOB (wt %) | Retention rate after 800 cycles at 25° C. | High-temperature storage thickness swelling rate at 85° C. |
|---|---|---|---|---|---|---|
| Embodiment 4 | I-5 | 0.5 | | | 87.9% | 13.0% |
| Embodiment 35 | I-5 | 0.5 | 0.1 | | 88.5% | 12.0% |
| Embodiment 36 | I-5 | 0.5 | 0.2 | | 89.7% | 11.5% |
| Embodiment 37 | I-5 | 0.5 | 0.5 | | 91.2% | 10.9% |
| Embodiment 38 | I-5 | 0.5 | 1 | | 90.7% | 11.1% |
| Embodiment 39 | I-5 | 0.5 | | 0.1 | 89.0% | 11.6% |
| Embodiment 40 | I-5 | 0.5 | | 0.3 | 90.8% | 11.0% |
| Embodiment 41 | I-5 | 0.5 | | 0.5 | 91.7% | 10.6% |
| Embodiment 42 | I-5 | 0.5 | 1 | 0.5 | 92.4% | 10.1% |
| Embodiment 43 | I-5 | 0.5 | 0.5 | 0.2 | 92.1% | 10.9% |
| Embodiment 44 | I-5 | 0.5 | 0.5 | 0.5 | 92.3% | 10.3% |
| Embodiment 45 | I-5 | 0.5 | 1 | 2 | 92.1% | 10.7% |
| Embodiment 46 | I-1 | 0.5 | 0.2 | | 89.2% | 12.2% |
| Embodiment 47 | I-7 | 0.5 | 0.2 | | 89.5% | 10.7% |
| Embodiment 48 | I-11 | 0.5 | 0.2 | | 90.2% | 12.3% |
| Embodiment 49 | I-13 | 0.5 | 0.2 | 0.6 | 89.9% | 10.0% |

Instances of combinations of the compound of formula I of this application and the boron-containing lithium salt were illustrated by Embodiments 35 to 49. It can be seen from the test results that the combinations could significantly improve the high-temperature storage and cycle performance of electrochemical devices.

TABLE 3

Electrolytes and test results of Embodiments 4, and 50 to 66

| Embodiment | Compound of formula I Structural formula | Content (wt %) | Compound containing P—O bond LiPO$_2$F$_2$ (wt %) | 1,2-bis((difluoro-phosphino)oxy) ethane (wt %) | High-temperature storage thickness swelling rate at 85° C. |
|---|---|---|---|---|---|
| Embodiment 4 | I-5 | 0.5 | | | 13.0% |
| Embodiment 50 | I-5 | 0.5 | 0.1 | | 11.7% |
| Embodiment 51 | I-5 | 0.5 | 0.3 | | 11.0% |
| Embodiment 52 | I-5 | 0.5 | 0.5 | | 10.2% |
| Embodiment 53 | I-5 | 0.5 | 0.7 | | 9.3% |
| Embodiment 54 | I-5 | 0.5 | 0.9 | | 8.7% |
| Embodiment 55 | I-1 | 0.5 | 0.5 | | 12.1% |
| Embodiment 56 | I-11 | 0.5 | 0.5 | | 10.5% |
| Embodiment 57 | I-13 | 0.5 | 0.5 | | 9.7% |
| Embodiment 58 | I-19 | 0.5 | 0.5 | | 9.2% |
| Embodiment 59 | I-5 | 0.5 | | 0.5 | 10.9% |
| Embodiment 60 | I-1 | 0.5 | | 0.5 | 13.1% |
| Embodiment 61 | I-11 | 0.5 | | 0.5 | 10.9% |
| Embodiment 62 | I-13 | 0.5 | | 0.5 | 10.7% |
| Embodiment 63 | I-19 | 0.5 | | 0.5 | 10.1% |
| Embodiment 64 | I-5 | 0.5 | 0.3 | 0.5 | 8.9% |
| Embodiment 65 | I-5 | 0.5 | 1 | 0.3 | 10.3% |
| Embodiment 66 | I-5 | 0.5 | 1.5 | 1.5 | 12.7% |

It can be seen from Embodiments 50 to 66 and Embodiment 4 that combinations of an additionally added P—O bond and the compound of formula I of this application could further improve the high-temperature storage performance of electrochemical devices. This was because the combined action of the compound containing a P—O bond (for example, lithium difluorophosphate and lithium tetrafluoro(oxalato)phosphate) and the compound of formula I formed a film on a positive electrode, which could reduce contact between the electrolyte and the positive electrode to inhibit gas production.

TABLE 4

Electrolytes and test results of Embodiments 4, 13, 14, and 67 to 82 and Comparative Embodiments 2 to 5

| Embodiment | Compound of formula I Structural formula | Content (wt %) | TCEP (wt %) | HTCN (wt %) | DENE (wt %) | ADN (wt %) | Thickness swelling rate in floating charge at 45° C. | Retention rate after 800 cycles at 25° C. |
|---|---|---|---|---|---|---|---|---|
| Embodiment 4 | I-5 | 0.5 | | | | | 15.8% | 87.9% |
| Embodiment 13 | I-13 | 0.5 | | | | | 15.5% | 88.2% |
| Embodiment 14 | I-19 | 0.3 | | | | | 17.9% | 81.6% |
| Embodiment 67 | I-5 | 0.5 | 0.5 | | | | 12.7% | 89.6% |
| Embodiment 68 | I-5 | 0.5 | | 0.5 | | | 12.3% | 88.7% |
| Embodiment 69 | I-5 | 0.5 | | | 0.5 | 0.5 | 13.6% | 88.2% |
| Embodiment 70 | I-5 | 0.5 | | 0.5 | 1 | 0.5 | 9.0% | 89.2% |
| Embodiment 71 | I-5 | 0.5 | | 0.5 | 1 | 2 | 8.3% | 89.3% |
| Embodiment 72 | I-5 | 0.5 | | 0.5 | 2 | 4 | 9.1% | 88.9% |
| Embodiment 73 | I-5 | 0.5 | | 1 | 1 | 2 | 8.1% | 89.8% |
| Embodiment 74 | I-5 | 0.5 | | 1 | 3 | 4 | 9.9% | 88.3% |
| Embodiment 75 | I-5 | 0.5 | | 2 | 3 | 5 | 10.9% | 86.6% |
| Embodiment 76 | I-5 | 0.5 | | 3 | 1 | 1 | 7.2% | 85.9% |
| Embodiment 77 | I-5 | 0.5 | | 2 | 1 | 1 | 7.5% | 86.3% |
| Embodiment 78 | I-13 | 0.5 | 0.5 | | | | 12.3% | 90.1% |
| Embodiment 79 | I-19 | 0.3 | 0.5 | | | | 12.6% | 84.5% |

TABLE 4-continued

Electrolytes and test results of Embodiments 4, 13, 14, and 67 to 82 and Comparative Embodiments 2 to 5

| Embodiment | Compound of formula I | | Polynitrile compound | | | | Thickness swelling rate in floating charge at 45° C. | Retention rate after 800 cycles at 25° C. |
|---|---|---|---|---|---|---|---|---|
| | Structural formula | Content (wt %) | TCEP (wt %) | HTCN (wt %) | DENE (wt %) | ADN (wt %) | | |
| Embodiment 80 | I-19 | 0.3 | | 0.5 | 1 | 0.5 | 8.8% | 83.7% |
| Embodiment 81 | I-13 | 0.5 | | 0.5 | | | 11.7% | 89.0% |
| Embodiment 82 | I-13 | 0.5 | | 0.5 | 1 | 0.5 | 8.8% | 89.5% |
| Comparative Embodiment 2 | | | 1 | | | | 16.2% | 86.5% |
| Comparative Embodiment 3 | | | | 1 | | | 16.1% | 84.2% |
| Comparative Embodiment 4 | | | | | 1 | | 52.3% | 79.1% |
| Comparative Embodiment 5 | | | | | | 1 | 53.1% | 78.5% |

The inventor of this application unexpectedly found that combinations of the compound of formula I of this application and a polynitrile compound could effectively reduce viscosity and cost of the electrolyte. It can be seen from the test results in Table 4 that the combinations of the compound of formula I according to this application and a polynitrile compound could significantly improve floating charge performance and cycle performance of the battery. However, the excessive addition of a polynitrile compound could lead to excessive viscosity of the electrolyte, thereby affecting kinetics and reducing the improvement of cycle performance.

In Embodiments 83 to 90, the lithium-ion battery was prepared based on the method described above by using basic electrolyte 2, positive electrode 1, and negative electrode 1, and subjected to an overcharge test. Embodiments 83 to 90 were based on Embodiment 4, with addition of materials shown in Table 5.

It can be seen from the test results in Table 5 that the combined use of the compound of formula I provided in this application and a plurality of materials could significantly improve floating charge performance and high temperature storage performance of the battery.

Embodiments 91 to 96 and Comparative Embodiments 6 and 7

In Embodiments 91 to 96 and Comparative Embodiments 6 and 7, the lithium-ion battery was prepared based on the method described above by using basic electrolyte 2, positive electrode 1, and negative electrode 1, and subjected to an overcharge test. The specific test method is as follows:

Overcharge test process: At 25° C., a battery was discharged at 0.5 C to 2.8V, constant-current charged at 2 C (6.8 A) to different voltages shown in the table, and then constant-voltage charged for 3 hours; changes of surface tem-

TABLE 5

Electrolytes and test results of Embodiments 4, and 83 to 90

| Embodiment | Compound containing a sulfur-oxygen double bond | | Boron-containing lithium salt | | Compound containing P—O bond | | Polynitrile compound | | Thickness swelling rate in floating charge at 45° C. | High-temperature storage thickness swelling rate at 85° C. |
|---|---|---|---|---|---|---|---|---|---|---|
| | Structural formula | Content (wt %) | Material | Content (wt%) | Material | Content (wt %) | Material | Content (wt %) | | |
| Embodiment 4 | | | | | | | | | 15.8% | 13.0% |
| Embodiment 83 | II-12 | 2 | | | | | HTCN + SN | 1 + 2 | 9.7% | 8.9% |
| Embodiment 84 | II-12 | 2 | | | | | TCEP | 1.5 | 8.7% | 8.2% |
| Embodiment 85 | II-12 | 2 | | | $LiPO_2F_2$ | 0.3 | TCEP + ADN | 1 + 2 | 8.3% | 7.8% |
| Embodiment 86 | II-12 + II-21 | 2 + 1 | | | $LiPO_2F_2$ | 0.3 | TCEP + ADN | 1 + 2 | 8.0% | 7.4% |
| Embodiment 87 | II-12 | 2 | | | $LiPO_2F_2$ | 0.3 | TCEP + DENE | 1 + 1 | 8.6% | 8.0% |
| Embodiment 88 | II-12 | 2 | $LiBF_4$ | 0.3 | $LiPO_2F_2$ | 0.3 | TCEP + DENE | 1 + 1 | 7.9% | 7.6% |
| Embodiment 89 | II-12 + II-21 | 1 + 1 | | | $LiPO_2F_2$ | 0.5 | TCEP | 1 | 8.9% | 8.3% |
| Embodiment 90 | II-12 + II-18 | 1 + 1 | | | $LiPO_2F_2$ | 0.6 | TCEP + ADN + DENE | 1 + 1 + 1 | 7.9% | 7.5% | perature of the battery were monitored; the battery passed the test if there was no fire or smoke, and the number of the batteries that passed the test was counted; and 10 batteries were tested in each group, and the number of the batteries that passed the test was recorded.

TABLE 6

Electrolytes and test results of Embodiments 91 to 96 and Comparative Embodiments 6 and 7

| Embodiment | Compound of formula I | | Compound containing a sulfur-oxygen double bond | | Overcharge test | |
|---|---|---|---|---|---|---|
| | I-5 (wt %) | I-13 (wt %) | II-7 (wt %) | II-12 (wt %) | Voltage | Number of batteries that passed the test out of 10 batteries |
| Embodiment 4 | 0.5 | | | | 6 V | 0 |
| Embodiment 91 | 0.5 | | 0.5 | 2 | 6 V | 9 |
| Embodiment 92 | 0.5 | | 1 | 2 | 7 V | 10 |
| Embodiment 93 | 0.5 | | 3 | 2 | 8 V | 7 |
| Embodiment 94 | 0.5 | | 5 | 2 | 8 V | 10 |
| Embodiment 95 | | 0.5 | 5 | 2 | 8 V | 10 |
| Embodiment 96 | | 0.5 | 5 | 2 | 9 V | 6 |
| Comparative Embodiment 6 | | | 5 | 2 | 6 V | 0 |
| Comparative Embodiment 7 | | | 5 | 2 | 6 V | 0 |

It can be seen from the test results in Table 6 that compared with use of the compound of formula I or the compound containing a sulfur-oxygen double bond alone, the combined use of these two types of materials could significantly reduce overcharge performance of electrochemical devices. This was because the compound containing a sulfur-oxygen double bond used in this application could improve oxidation resistance of the electrolyte, and furthermore, could form a stable protective film on a surface of a negative electrode, effectively preventing lithium precipitation and reducing direct contact with the electrolyte, while the compound of formula I of this application could protect a positive electrode and inhibit decomposition of the electrolyte, and the combination of the two could significantly improve the overcharge performance.

Embodiments 97 to 100 and Comparative Embodiment 8

The lithium-ion battery was prepared by using basic electrolyte 3, positive electrode 2 and negative electrode 2, and subjected to a high temperature storage test at 60° C. The specific test method is as follows:

High-temperature storage test process at 60° C.: At 25° C., a battery was charged to 4.45V at a constant current of 0.5 C and then constant-voltage charged to 0.05 C. A thickness of the lithium-ion battery was measured and denoted as $D_3$; and the battery was placed in an oven at 60° C. for 30 days, and then the thickness of the battery was measured and denoted as $D_4$. Thickness swelling rate of the lithium-ion battery after high-temperature storage for 24 h was calculated according to the following formula:

High-temperature storage thickness swelling rate at 60° C. (%)=$(D_4-D_3/D_3\times100\%$.

Cycle test process at 45° C.: At 45° C., a battery was charged at 0.7 C to 4.45V, then charged at a constant voltage of 4.45V to 0.05 C, and then discharged at a current of 0.5 C to 3.0V, and this discharge capacity was recorded as CL Then the battery was charged at 0.5 C to a voltage of 4.45V, and then discharged at 0.5 C to 3.0V. The process was performed for 500 cycles as a cycle test, and a cycle capacity was recorded as $C_2$. A cycle capacity retention rate was calculated according to the following formula:

Cycle capacity retention rate at 45° C. (%)=$(C_2-C_1)/C_1\times100\%$.

The specific test results were shown in Table 7.

TABLE 7

Electrolytes and test results of Embodiments 97 to 100 and Comparative Embodiment 8

| | Compound of formula I | | Storage thickness | Retention rate |
|---|---|---|---|---|
| | I-5 wt % | I-13 wt % | swelling rate at 60° C. | after 500 cycles at 45° C. |
| Embodiment 97 | 1 | | 19.3% | 86.2% |
| Embodiment 98 | | 1 | 16.9% | 87.9% |
| Embodiment 99 | 0.5 | | 18.5% | 79.6% |
| Embodiment 100 | 0.5 | 0.5 | 13.5% | 87.1% |
| Comparative Embodiment 8 | | | 95.6% | 59.2% |

It can be seen from the above results that compared with Comparative Embodiment 8, adding the compound of formula I according to this application could significantly improve the high temperature storage performance. The compound of formula I of this application could improve interface stability of a positive electrode material. In addition, phosphorus contained in the compound of formula I could absorb oxygen released by a positive electrode, reduce decomposition of the electrolyte, and inhibit gas production, thereby improving high-temperature storage and cycle performance.

References to "some embodiments", "some of the embodiments", "an embodiment", "another Embodiment", "Embodiments", "specific Embodiments", or "some Embodiments" in the specification mean the inclusion of specific features, structures, materials, or characteristics described in at least one embodiment or Embodiment of this application in the embodiment or Embodiment. Therefore, descriptions in various places throughout the specification, such as "in some embodiments", "in the embodiments", "in an embodiment", "in another Embodiment", "in an Embodiment", "in a specific Embodiment", or "Embodiments", do not necessarily refer to the same embodiment or Embodiment in this application. In addition, a specific feature, structure, material, or characteristic herein may be combined in any appropriate manner in one or more embodiments or Embodiments.

Although illustrative embodiments have been demonstrated and described, a person skilled in the art should understand that the foregoing embodiments are not to be construed as limiting this application, and that the embodiments may be changed, replaced, and modified without departing from the spirit, principle, and scope of this application.

What is claimed is:

1. An electrolyte, comprising at least a compound of formula I:

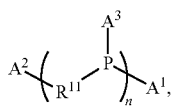
(formula I)

wherein $A^1$, $A^2$, and $A^3$ are each independently selected from the following formulas I-A, I-B, I-C, or I-D, and the $A^1$, $A^2$, and $A^3$ are not all I-A:

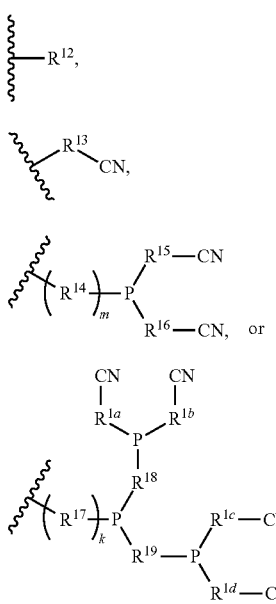

wherein

represents a binding site for binding to an adjacent atom, wherein m and k are each independently selected from 0 or 1, and n is selected from integers 1 to 6, wherein $R^{11}$, $R^{13}$, $R^{14}$, $R^{15}$, $R^{16}$, $R^{17}$, $R^{18}$, $R^{19}$, $R^{1a}$, $R^{1b}$, $R^{1c}$, and $R^{1d}$ are each independently selected from hydrogen, substituted or unsubstituted $C_1$-$C_{10}$ alkylidene groups, substituted or unsubstituted $C_2$-$C_{10}$ alkenylene groups, substituted or unsubstituted $C_2$-$C_{10}$ alkynylidene groups, substituted or unsubstituted $C_3$-$C_{10}$ cumulative dienyl groups, substituted or unsubstituted $C_6$-$C_{10}$ aryl groups, or substituted or unsubstituted $C_3$-$C_{10}$ alicyclic hydrocarbon groups; and $R^{12}$ is selected from substituted or unsubstituted $C_1$-$C_{10}$ alkyl groups, substituted or unsubstituted $C_2$-$C_{10}$ alkenyl groups, substituted or unsubstituted $C_2$-$C_{10}$ alkynyl groups, substituted or unsubstituted CVC in cumulative dienyl groups, substituted or unsubstituted $C_6$-$C_{10}$ aryl groups, substituted or unsubstituted $C_3$-$C_{10}$ alicyclic hydrocarbon groups, or substituted or unsubstituted heteroatom-containing functional groups, wherein when substitution is performed, substituents are each independently selected from halogens.

2. The electrolyte according to claim 1, wherein the compound of formula I comprises at least one of the following compounds:

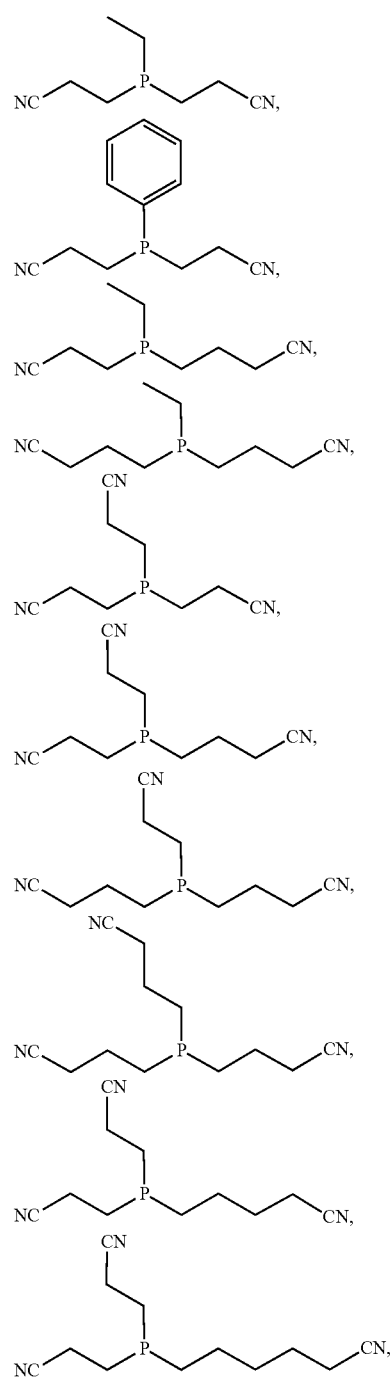

-continued
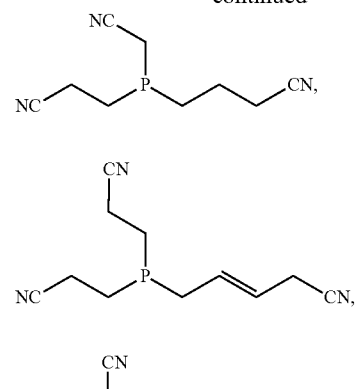
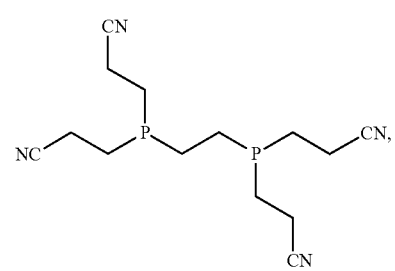
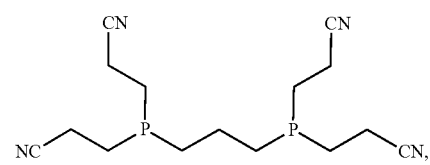
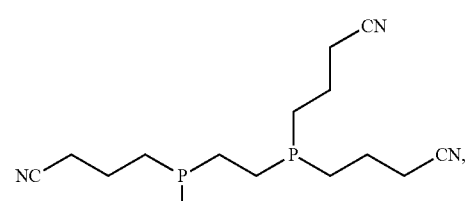
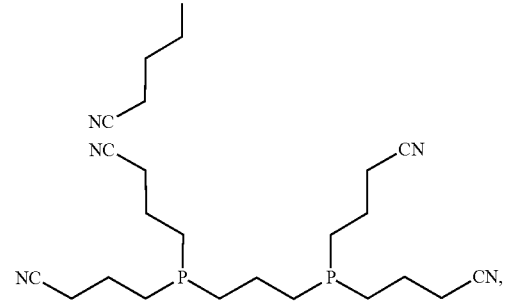
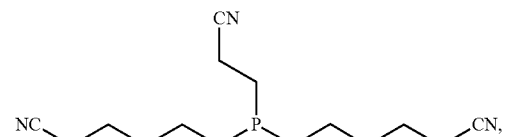
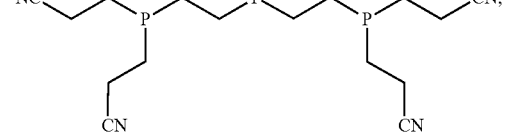
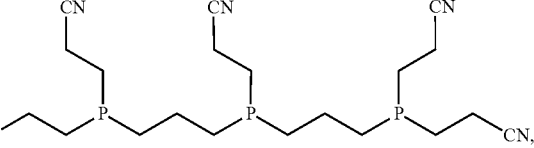
-continued
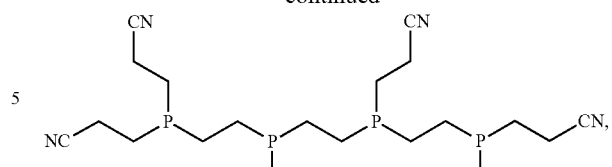
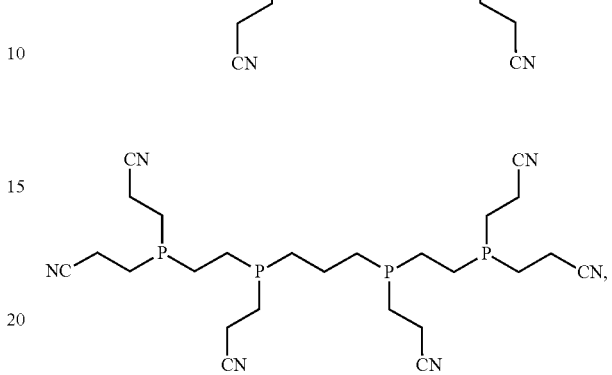
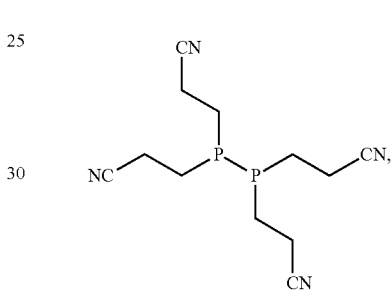
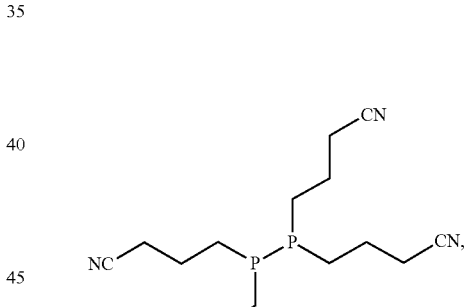
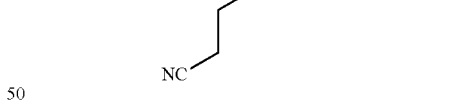
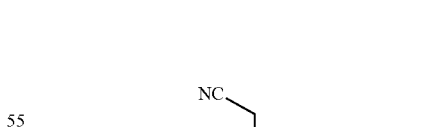
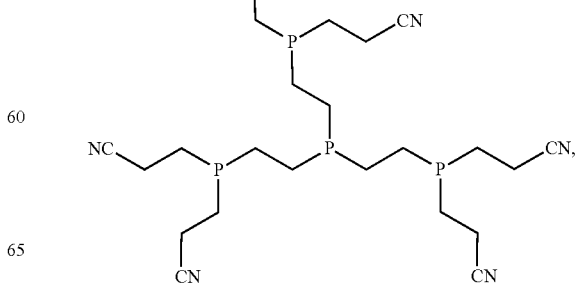

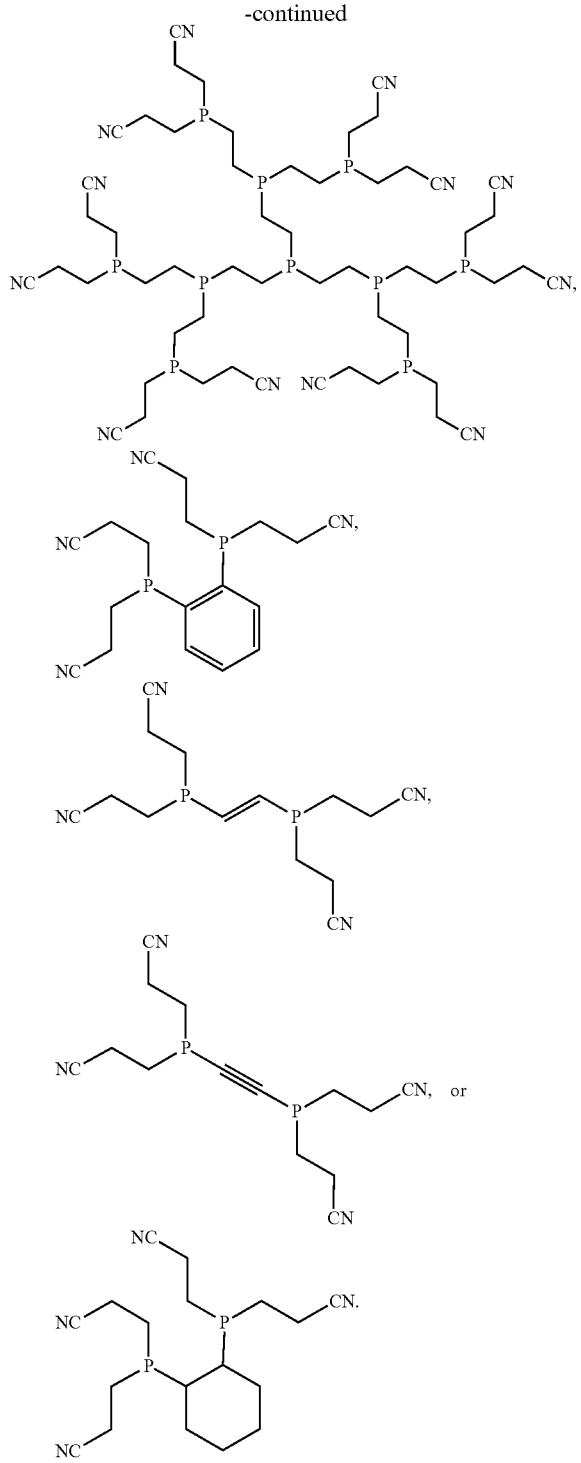

3. The electrolyte according to claim 1, wherein based on a total weight of the electrolyte, a percentage of the compound of formula I is 0.01% to 5%.

4. The electrolyte according to claim 1, further comprising a compound containing a sulfur-oxygen double bond; the compound containing the sulfur-oxygen double bond comprises at least one of the following compounds: sulfolane, 1,3-propanesultone, 1,4-butanesulfonate, methylene methanesulfonate, 1,3-propanedisulfonic anhydride, vinyl sulfate, vinyl sulfite, 4-methyl vinyl sulfate, 2,4-butane-sulfonate, 2-methyl-1,3-propan sulfonate, 1,3-butanesulfonate, 1-fluoro-1,3-propanesultone, 2-fluoro-1,3-propanesultone, 3-fluoro-1,3-propanesultone, propylene-1,3-sultone, propylene sulfate, propylene sulfite, or fluoroethylene sulfate; wherein based on a total weight of the electrolyte, a percentage of the compound containing the sulfur-oxygen double bond is 0.01% to 10%.

5. The electrolyte according to claim 1, further comprising a compound containing a P—O bond; the compound containing the P—O bond comprises at least one of the following compounds: lithium difluorophosphate, lithium difluorobisoxalate, lithium tetrafluoro(oxalato)phosphate, 1,2-bis((difluorophosphino)oxy)ethane, trimethyl phosphate, triphenyl phosphate, triisopropyl phosphate, 3,3,3-trifluoroethyl phosphate, 3,3,3-trifluoroethyl phosphite, tris(trimethylsilane) phosphate, pentafluoroethoxy cyclotriphosphazene, or pentafluoro(phenoxy)cyclotriphosphazene; wherein based on a total weight of the electrolyte, a percentage of the compound containing the P—O bond is 0.1% to 3%.

6. The electrolyte according to claim 1, further comprising a polynitrile compound; the polynitrile compound comprises at least one of the following compounds: adiponitrile, succinonitrile, 1,2-bis(2-cyanoethoxy)ethane, 1,2,3-propanetricarbonitrile, 1,3,5-pentanetricarbonitrile, 1,3,6-hexanetricarbonitrile, 1,2,6-hexamethylenetricarbonitrile, or 1,2,3-tris(2-cyanoethoxy)propane.

7. The electrolyte according to claim 6, wherein based on a total weight of the electrolyte, a percentage of the compound of formula I is a %; a percentage of the polynitrile compound is b %; and a content ratio of the compound of formula I to the polynitrile compound, a/b, is greater than or equal to 0.1 and less than or equal to 80.

8. An electrochemical device, comprising a positive electrode, a negative electrode, a separator, and the electrolyte comprising at least a compound of formula I:

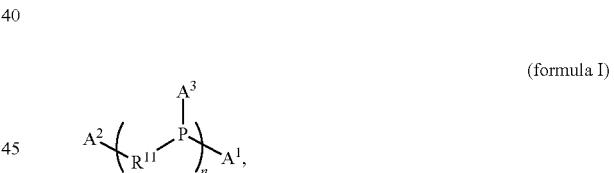

(formula I)

wherein $A^1$, $A^2$, and $A^3$ are each independently selected from the following formulas I-A, I-B, I-C, or I-D, and the $A^1$, $A^2$, and $A^3$ are not all I-A:

(I-A)

(I-B)

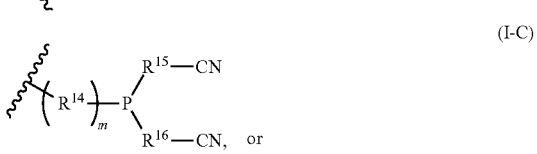

(I-C)

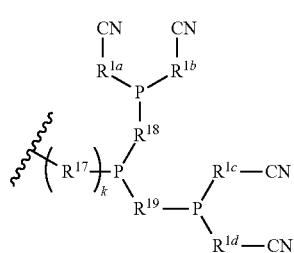

(I-D)

wherein represents a binding site for binding to an adjacent atom, wherein m and k are each independently selected from 0 or 1, and n is selected from integers 1 to 6, wherein $R^{11}$, $R^{13}$, $R^{14}$, $R^{15}$, $R^{16}$, $R^{17}$, $R^{18}$, $R^{19}$, $R^{1a}$, $R^{1b}$, $R^{1c}$, and $R^{1d}$ are each independently selected from hydrogen, substituted or unsubstituted $C_1$-$C_{10}$ alkylidene groups, substituted or unsubstituted $C_2$-$C_{10}$ alkenylene groups, substituted or unsubstituted $C_2$-$C_{10}$ alkynylidene groups, substituted or unsubstituted $C_3$-$C_{10}$ cumulative dienyl groups, substituted or unsubstituted $C_6$-$C_{10}$ aryl groups, or substituted or unsubstituted $C_3$-$C_{10}$ alicyclic hydrocarbon groups; and $R^{12}$ is selected from substituted or unsubstituted $C_1$-$C_{10}$ alkyl groups, substituted or unsubstituted $C_2$-$C_{10}$ alkenyl groups, substituted or unsubstituted $C_2$-$C_{10}$ alkynyl groups, substituted or unsubstituted $C_3$-$C_{10}$ in cumulative dienyl groups, substituted or unsubstituted $C_6$-$C_{10}$ aryl groups, substituted or unsubstituted $C_3$-$C_{10}$ alicyclic hydrocarbon groups, or substituted or unsubstituted heteroatom-containing functional groups, wherein when substitution is performed, substituents are each independently selected from halogens.

9. The electrochemical device according to claim 8, wherein the electrolyte further comprises a metal element, and the metal element comprises at least one of Cu, Co, Ni, or Mn, wherein the amount of the metal element contained in the electrolyte is less than 1000 ppm.

10. The electrochemical device according to claim 8, wherein the negative electrode comprises a negative electrode active material layer and a negative electrode current collector, the negative electrode active material layer contains a negative electrode active material, and the negative electrode active material comprises a silicon-containing material.

11. An electronic device, comprising the electrochemical device, the electrochemical device comprising a positive electrode, a negative electrode, a separator, and the electrolyte comprising at least a compound of formula I:

(formula I)

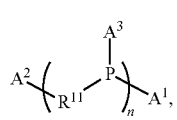

wherein $A^1$, $A^2$, and $A^3$ are each independently selected from the following formulas I-A, I-B, I-C, or I-D, and the $A^1$, $A^2$, and $A^3$ are not all I-A:

(I-A)

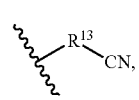
(I-B)

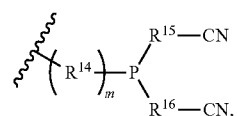
(I-C)

(I-D)

wherein represents a binding site for binding to an adjacent atom, wherein m and k are each independently selected from 0 or 1, and n is selected from integers 1 to 6, wherein $R^{11}$, $R^{13}$, $R^{14}$, $R^{15}$, $R^{16}$, $R^{17}$, $R^{18}$, $R^{19}$, $R^{1a}$, $R^{1b}$, $R^{1c}$, and $R^{1d}$ are each independently selected from hydrogen, substituted or unsubstituted $C_1$-$C_{10}$ alkylidene groups, substituted or unsubstituted $C_2$-$C_{10}$ alkenylene groups, substituted or unsubstituted $C_2$-$C_{10}$ alkynylidene groups, substituted or unsubstituted $C_3$-$C_{10}$ cumulative dienyl groups, substituted or unsubstituted $C_6$-$C_{10}$ aryl groups, or substituted or unsubstituted $C_3$-$C_{10}$ alicyclic hydrocarbon groups; and $R^{12}$ is selected from substituted or unsubstituted $C_1$-$C_{10}$ alkyl groups, substituted or unsubstituted $C_2$-$C_{10}$ alkenyl groups, substituted or unsubstituted $C_2$-$C_{10}$ alkynyl groups, substituted or unsubstituted $C_3$-$C_{10}$ cumulative dienyl groups, substituted or unsubstituted $C_6$-$C_{10}$ aryl groups, substituted or unsubstituted $C_3$-$C_{10}$ alicyclic hydrocarbon groups, or substituted or unsubstituted heteroatom-containing functional groups, wherein when substitution is performed, substituents are each independently selected from halogens.

\* \* \* \* \*